United States Patent
Halsey, Jr. et al.

(10) Patent No.: US 10,699,510 B2
(45) Date of Patent: Jun. 30, 2020

(54) MODULAR VENDING SYSTEM FOR PROPANE CYLINDERS

(71) Applicant: JALH Enterprises LLC, Granbury, TX (US)

(72) Inventors: Leonard J. Halsey, Jr., Granbury, TX (US); John S. Agor, Granbury, TX (US)

(73) Assignee: JALH Enterprises LLC, Granbury, TX (US)

(*) Notice: Subject to any disclaimer, the term of this patent is extended or adjusted under 35 U.S.C. 154(b) by 67 days.

(21) Appl. No.: 16/014,335

(22) Filed: Jun. 21, 2018

(65) Prior Publication Data

US 2019/0026971 A1    Jan. 24, 2019

Related U.S. Application Data

(63) Continuation of application No. 15/355,631, filed on Nov. 18, 2016, now Pat. No. 10,008,068, which is a continuation-in-part of application No. 14/818,673, filed on Aug. 5, 2015, now abandoned.

(60) Provisional application No. 62/257,447, filed on Nov. 19, 2015, provisional application No. 62/319,540, filed on Apr. 7, 2016.

(51) Int. Cl.
| | | |
|---|---|---|
| G07F 9/00 | (2006.01) |
| G07F 17/12 | (2006.01) |
| G07F 7/06 | (2006.01) |
| G07F 7/08 | (2006.01) |
| G07F 11/62 | (2006.01) |
| G07F 15/00 | (2006.01) |
| G06K 19/077 | (2006.01) |
| A47B 47/00 | (2006.01) |

(52) U.S. Cl.
CPC .......... G07F 9/006 (2013.01); G06K 19/077 (2013.01); G07F 7/0609 (2013.01); G07F 7/08 (2013.01); G07F 11/62 (2013.01); G07F 15/001 (2013.01); G07F 17/12 (2013.01); A47B 47/0091 (2013.01)

(58) Field of Classification Search
CPC .......... G07F 7/08; G07F 7/0609; G07F 9/006; G07F 11/62; G07F 15/001; G07F 17/12; A47B 47/0091; G06K 19/077
See application file for complete search history.

(56) References Cited

U.S. PATENT DOCUMENTS 3,360,321 A    12/1967 Novales
3,917,046 A    11/1975 Yorisue et al.
(Continued)

*Primary Examiner* — Mark J Beauchaine
(74) *Attorney, Agent, or Firm* — Craig Lervick; Larkin Hoffman Daly & Lindgren, Ltd.

(57) ABSTRACT

A outdoor large item vending system for large items such as propane tanks, liquid petroleum gas cylinders of various sizes and other items that must be stored in and dispensed from a hazardous location compliant system (i.e. a Class I, Division 2 compliant system). The vending system can be placed on a store front, parking lot, campsite, or park, and comprises a main housing having compartments to hold large items such as propane container, which are dispensed from the compartments when a payment is made through a credit card reader interface located in the main housing. The large item vending system of the invention is powered by AC current which is turned to DC power by a power supply, or DC batteries charged by AC power and/or solar power, or by other power means.

5 Claims, 20 Drawing Sheets

(56) References Cited

U.S. PATENT DOCUMENTS

| | | | |
|---|---|---|---|
| 4,204,635 A | 5/1980 | Hofmann et al. | |
| 5,360,093 A | 11/1994 | Baer | |
| 5,538,159 A | 7/1996 | Snyder et al. | |
| 5,829,630 A | 11/1998 | Fernald | |
| 6,192,296 B1 | 2/2001 | Colmant et al. | |
| 6,460,728 B2 | 10/2002 | Kamimura | |
| 6,474,502 B2 | 11/2002 | Mc Cord et al. | |
| 6,547,131 B1 | 4/2003 | Foodman et al. | |
| 6,761,194 B1 * | 7/2004 | Blong | F17C 13/084 141/98 |
| D545,373 S | 6/2007 | Steffens | |
| D593,157 S | 5/2009 | Segal et al. | |
| 8,082,061 B2 | 12/2011 | Segal et al. | |
| 8,191,779 B2 | 6/2012 | Illingworth et al. | |
| 8,392,019 B2 | 3/2013 | Segal et al. | |
| 8,442,700 B2 | 5/2013 | Anderson | |
| 8,463,430 B2 | 6/2013 | Segal et al. | |
| 8,463,431 B2 | 6/2013 | Segal et al. | |
| 8,469,228 B2 | 6/2013 | Adams | |
| 8,473,864 B2 | 6/2013 | Segal et al. | |
| 8,620,472 B2 | 12/2013 | Mockus et al. | |
| 8,678,232 B2 | 3/2014 | Mockus et al. | |
| 8,712,585 B2 | 5/2014 | Bruck et al. | |
| 8,781,622 B2 | 7/2014 | Mockus et al. | |
| 9,223,315 B2 | 12/2015 | Irwin et al. | |
| 9,390,575 B1 | 7/2016 | Clark | |
| 2004/0245278 A1 | 12/2004 | Steffens et al. | |
| 2007/0095901 A1 | 5/2007 | Illingworth | |
| 2007/0151981 A1 | 7/2007 | Halsey, Sr. et al. | |
| 2007/0170201 A1 | 7/2007 | Steffens | |
| 2007/0193318 A1 | 8/2007 | Churchill et al. | |
| 2008/0188980 A1 | 8/2008 | Home | |
| 2009/0145919 A1 | 6/2009 | Dueck et al. | |
| 2010/0100236 A1 | 4/2010 | Segal et al. | |
| 2010/0103131 A1 | 4/2010 | Segal et al. | |
| 2010/0262282 A1 | 10/2010 | Segal et al. | |
| 2011/0010110 A1 | 1/2011 | Yokohata et al. | |
| 2011/0022980 A1 | 1/2011 | Segal et al. | |
| 2011/0054673 A1 | 3/2011 | Segal et al. | |
| 2012/0029691 A1 | 2/2012 | Mockus et al. | |
| 2012/0078412 A1 | 3/2012 | Mockus et al. | |
| 2012/0123587 A1 | 5/2012 | Mockus et al. | |
| 2012/0215347 A1 | 8/2012 | Illingworth et al. | |
| 2012/0222938 A1 | 9/2012 | Rose, Jr. et al. | |
| 2014/0103062 A1 | 4/2014 | Rose, Jr. et al. | |
| 2015/0102051 A1 | 4/2015 | Shimmerlik et al. | |
| 2015/0179006 A1 * | 6/2015 | Von Zurmuehlen | G07F 17/12 340/5.54 |
| 2015/0203219 A1 | 7/2015 | Karch et al. | |
| 2015/0279147 A1 | 10/2015 | Illingworth et al. | |
| 2015/0315813 A1 | 11/2015 | Gallo et al. | |
| 2016/0068075 A1 | 3/2016 | Chen et al. | |
| 2016/0364930 A1 | 12/2016 | Chalise et al. | |
| 2017/0093220 A1 | 3/2017 | Freer et al. | |

\* cited by examiner

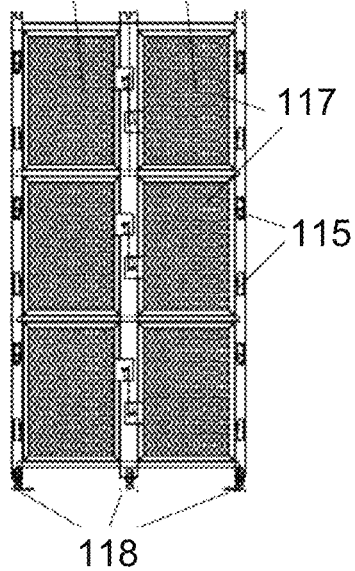
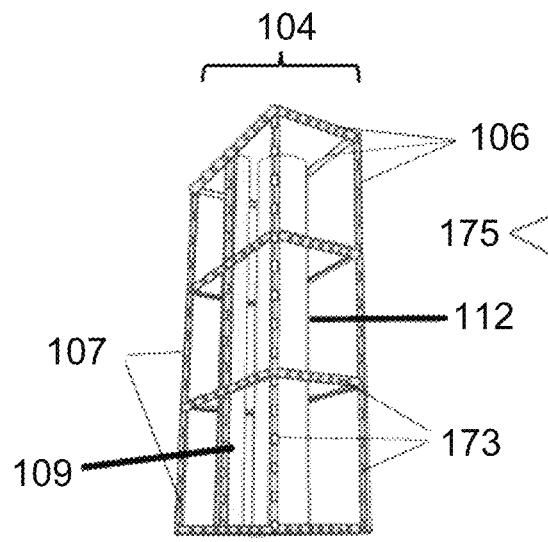
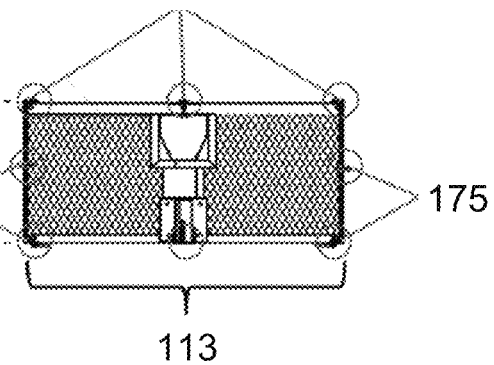

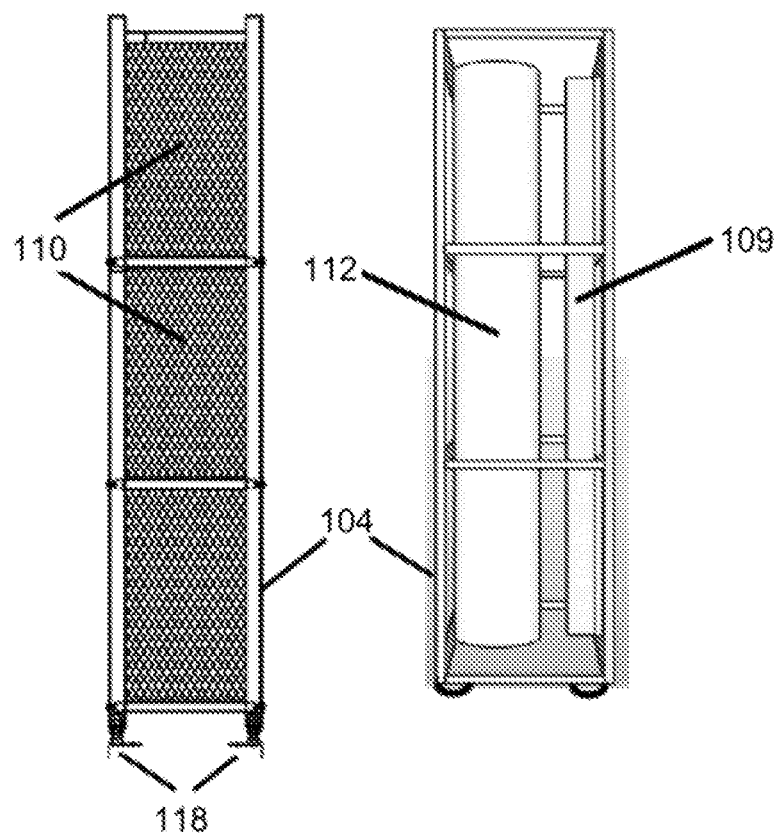

FIG. 5A
FIG. 5B
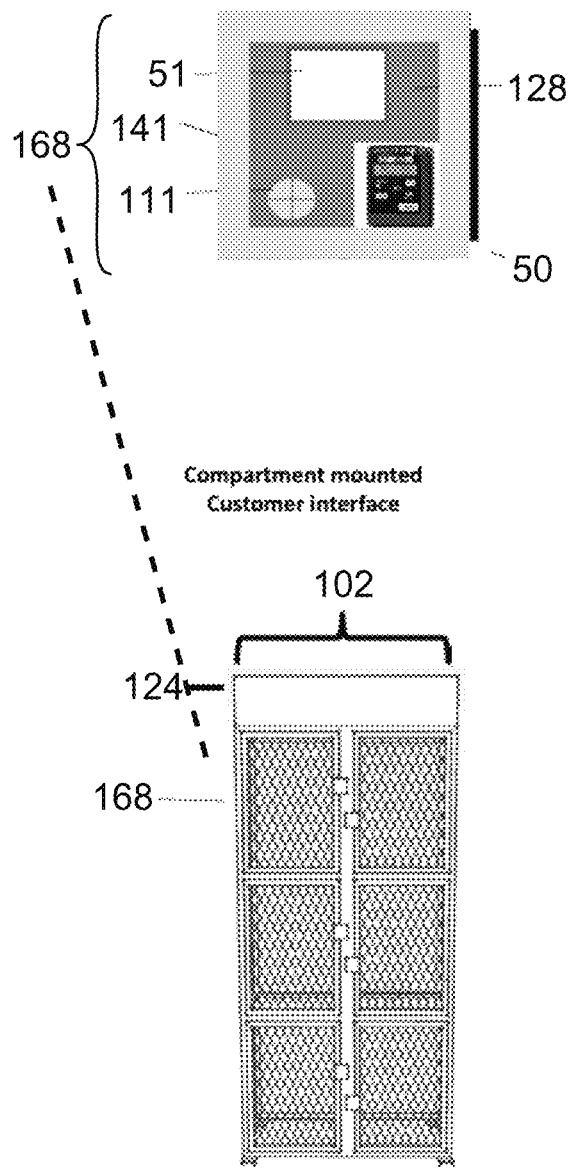
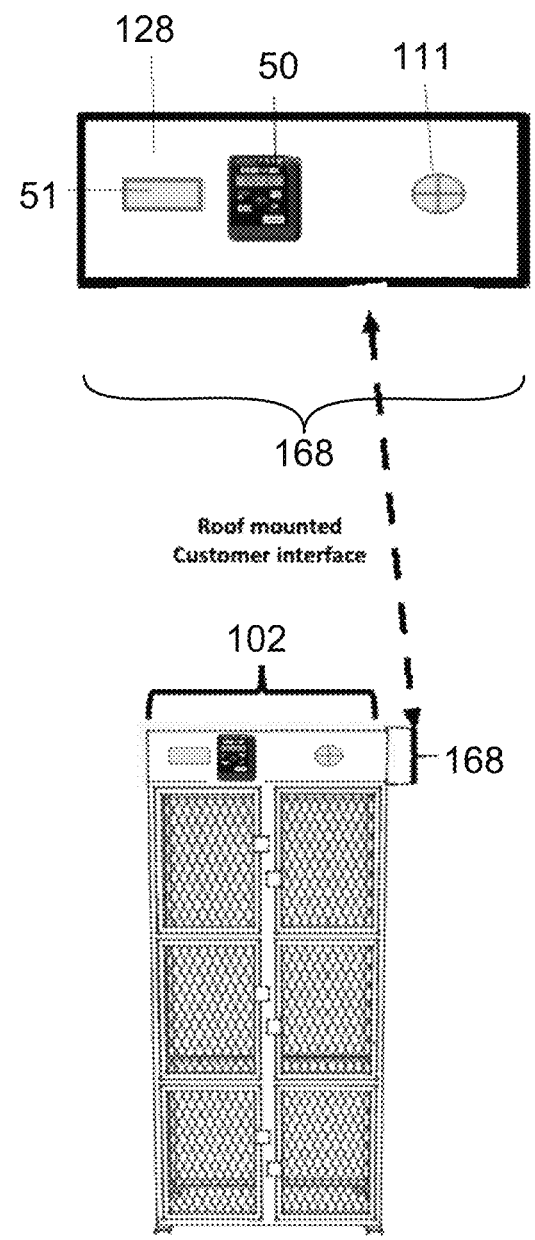

2 module side by side roof 1 module roof 2 module back to back roof

150

156

163

131

172
164

171

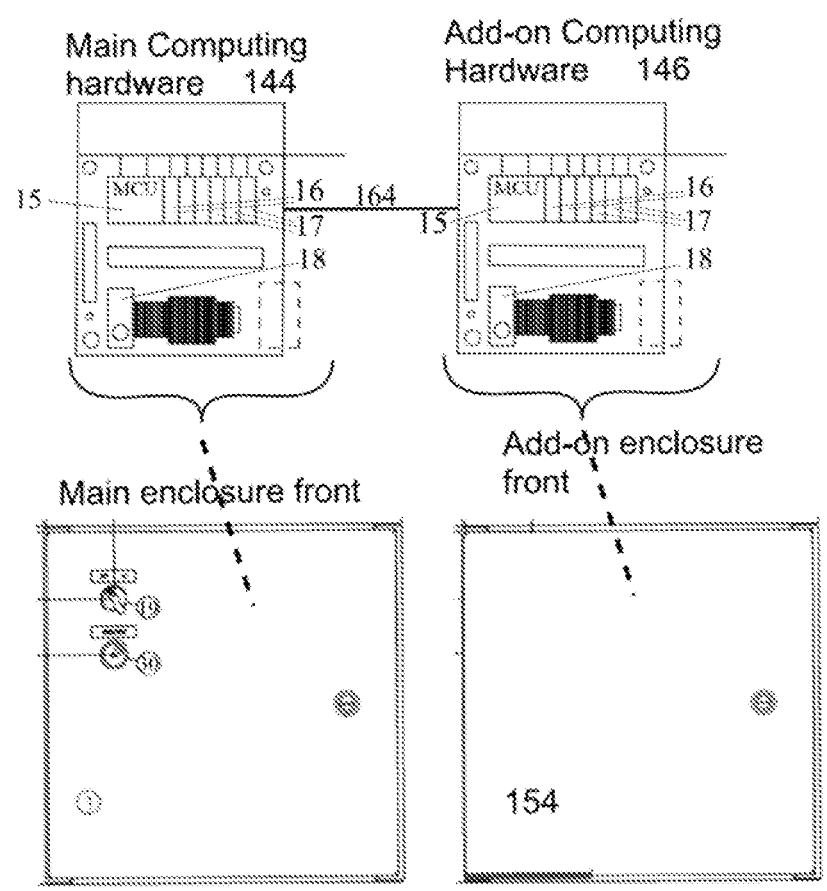

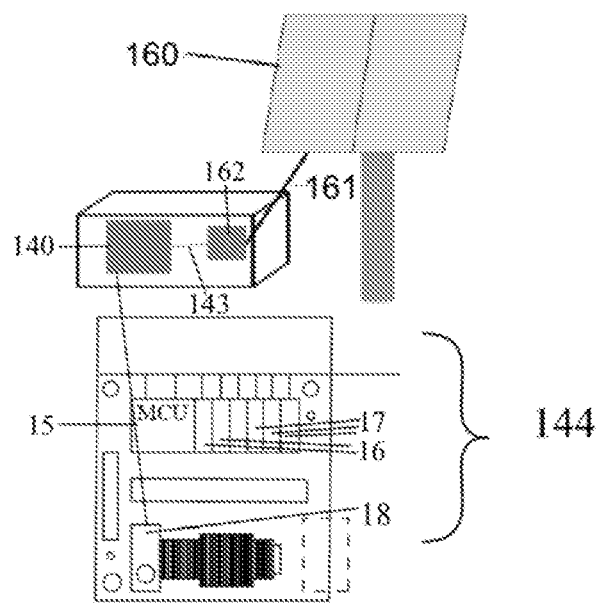
FIG. 13 - Solar Powered Option
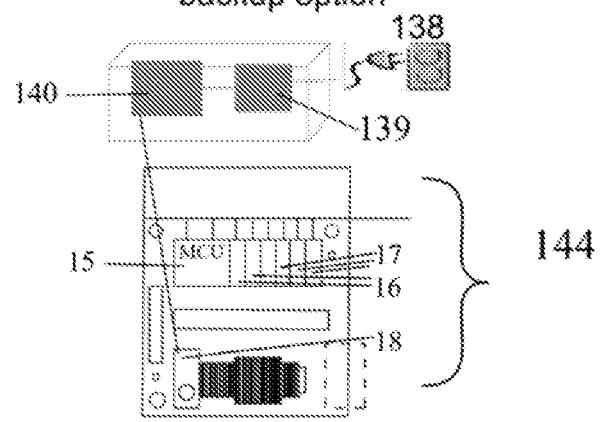
Fig. 14 - DC Battery backup option

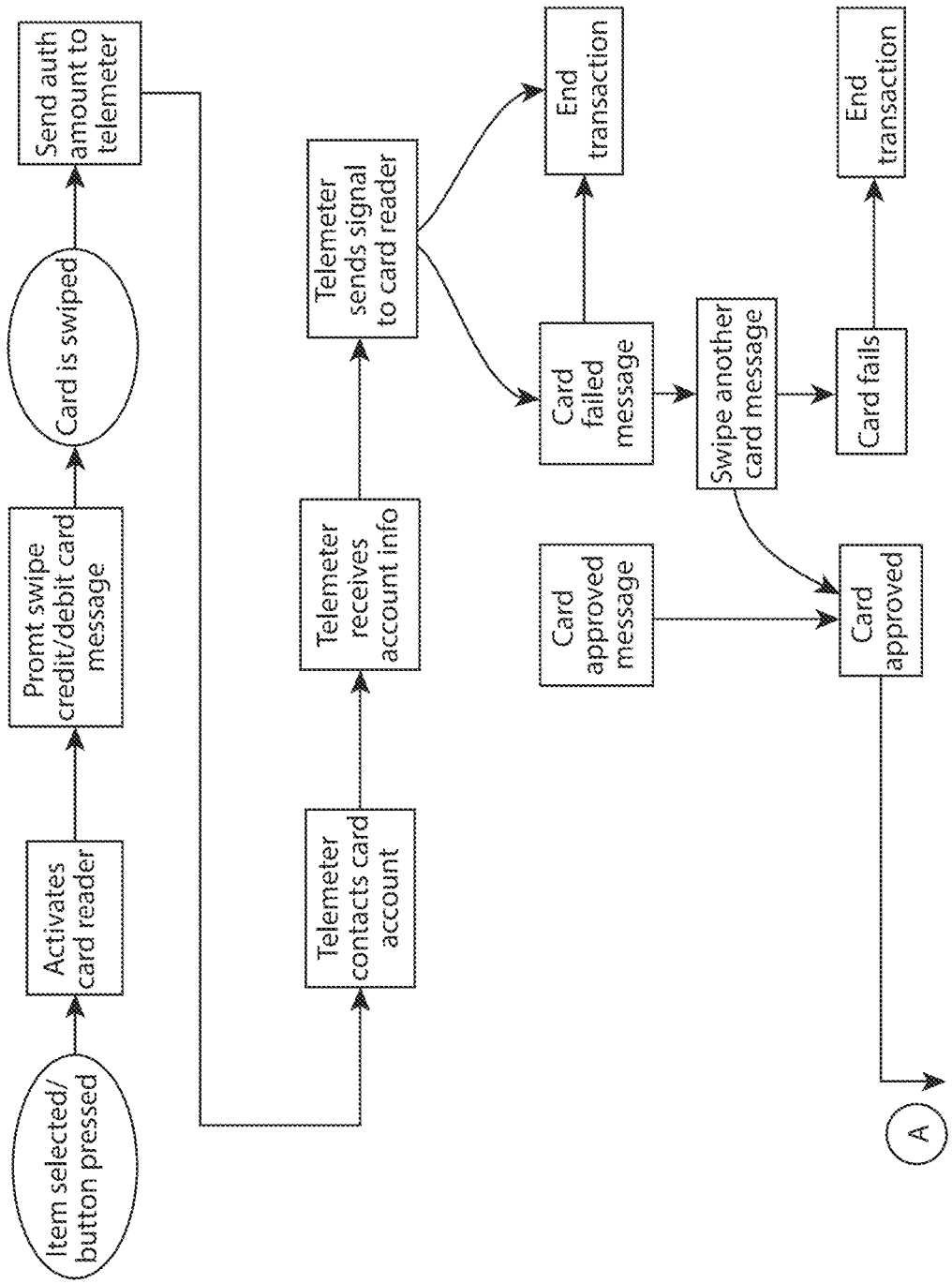
FIG. 15A - Machine Operations

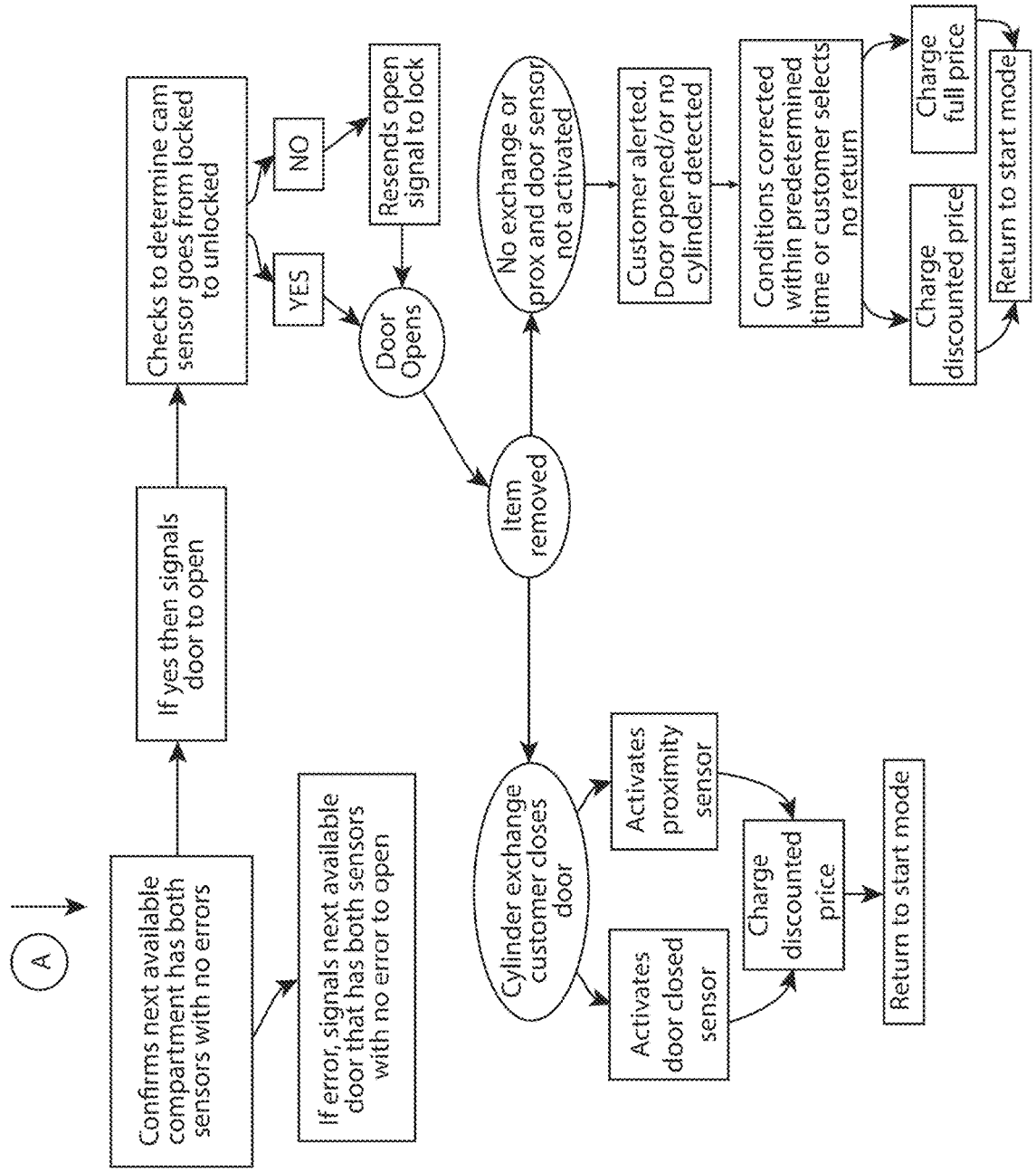
FIG. 15B - Machine Operations

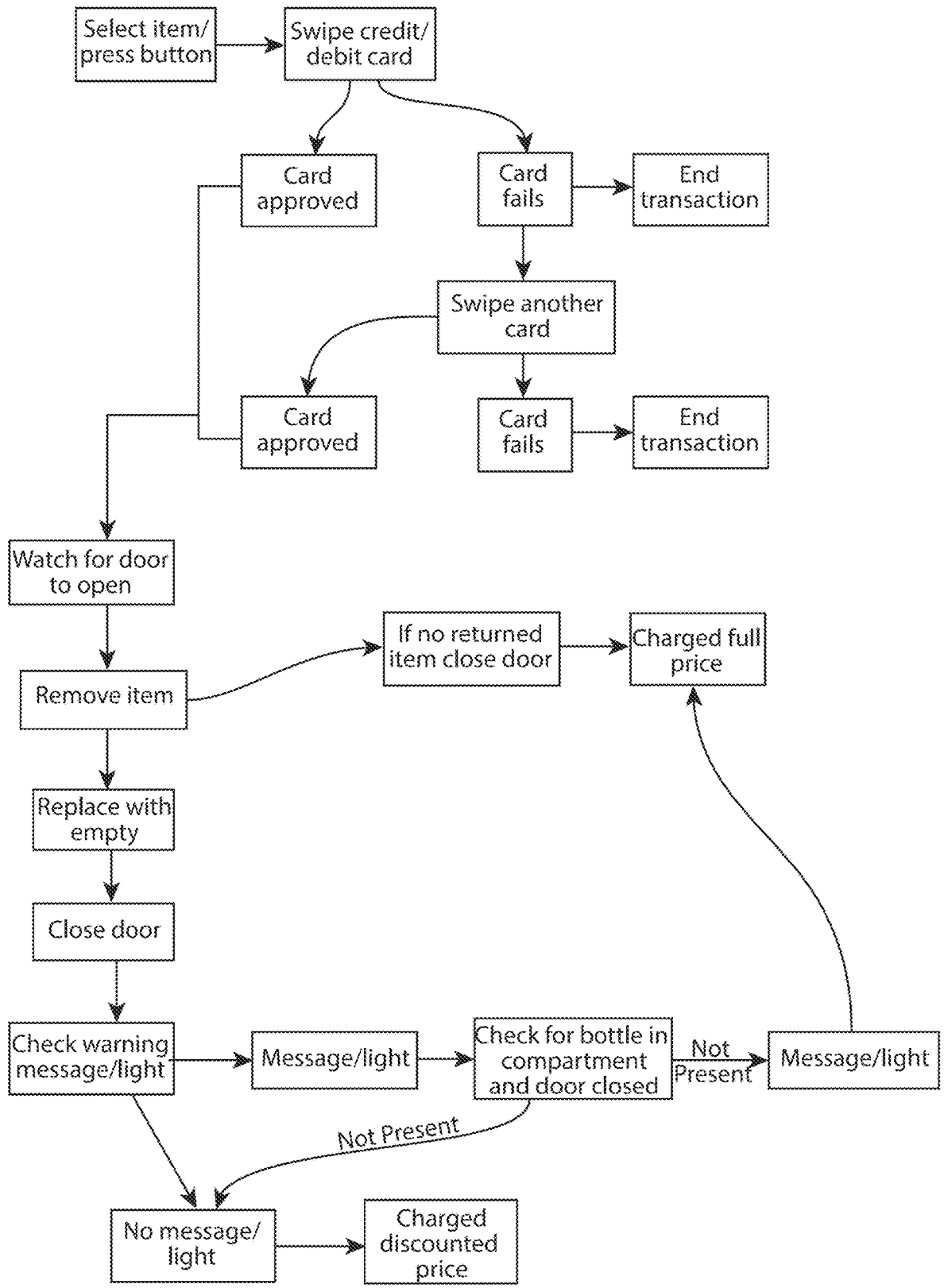
FIG. 16 - Customer Actions

FIG. 17A - Sample Owners Page
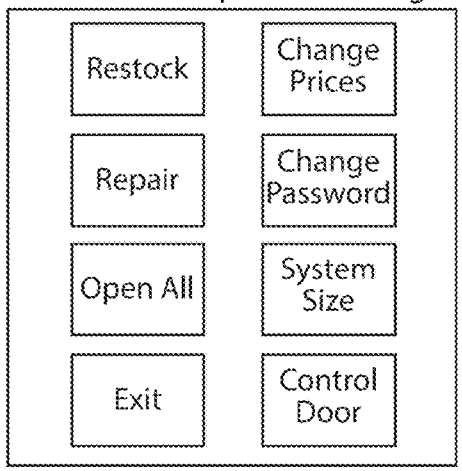
FIG. 17B - Change Prices Page
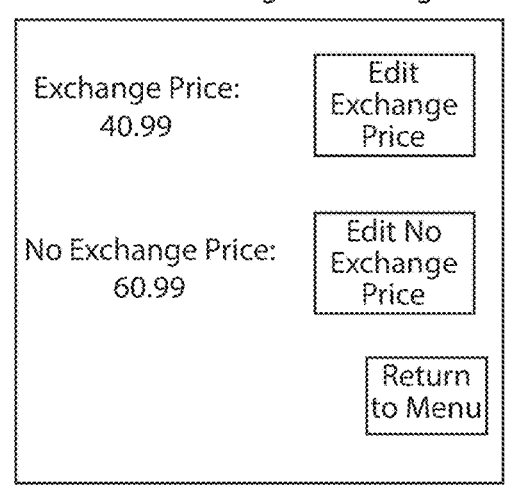
FIG. 17C - System Size Page
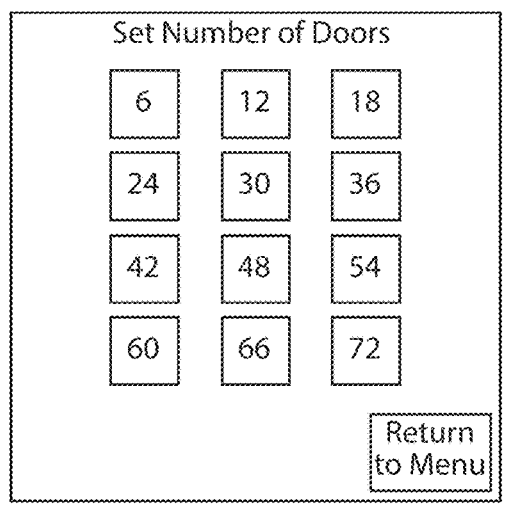
FIG. 17D - Repair Page
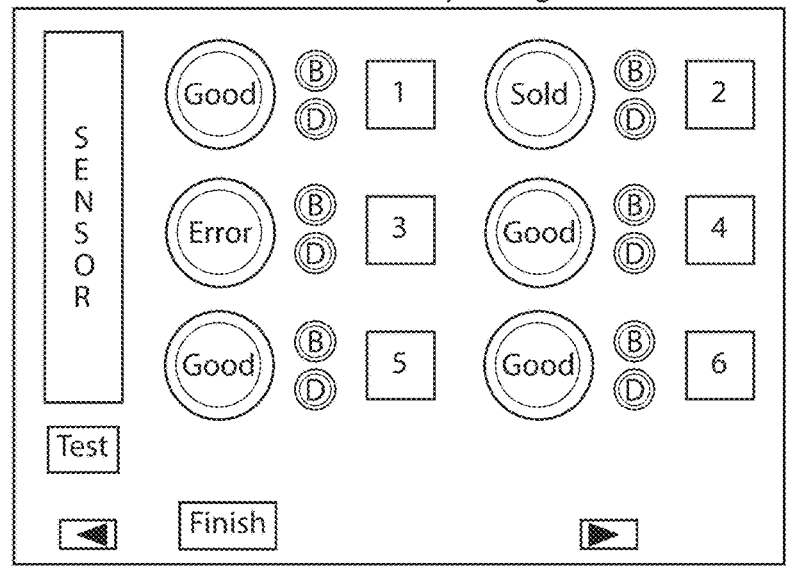

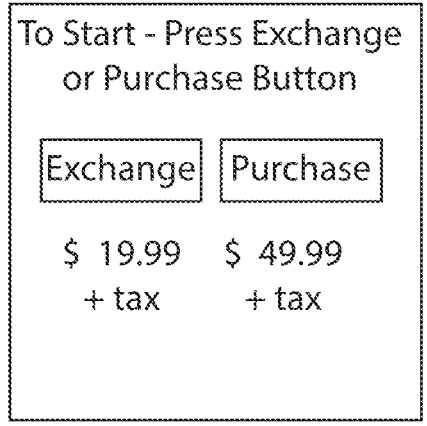
FIG. 18A - Sample Customer Message - Start
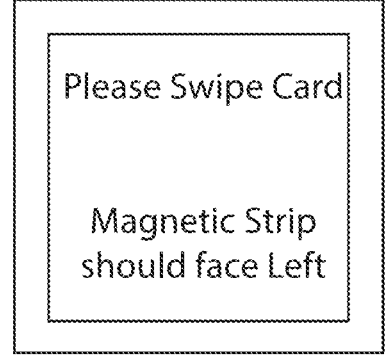
FIG. 18B - Sample Customer Message - Swipe Card
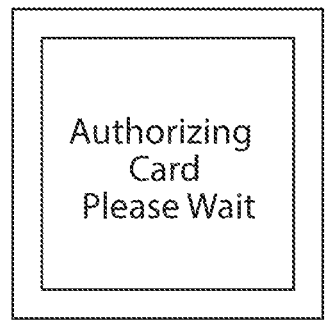
FIG. 18C - Sample Customer Message - Authorizing
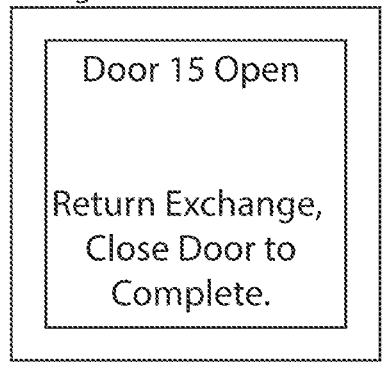
FIG. 18D - Sample Customer Message - Return Instructions
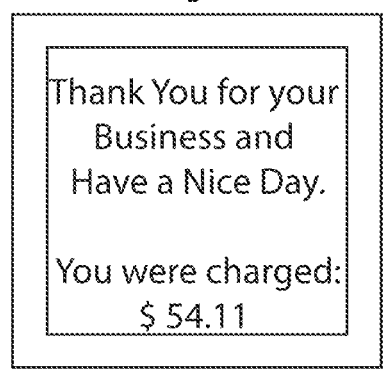
FIG. 18E - Sample Customer Message - End

127B

127A

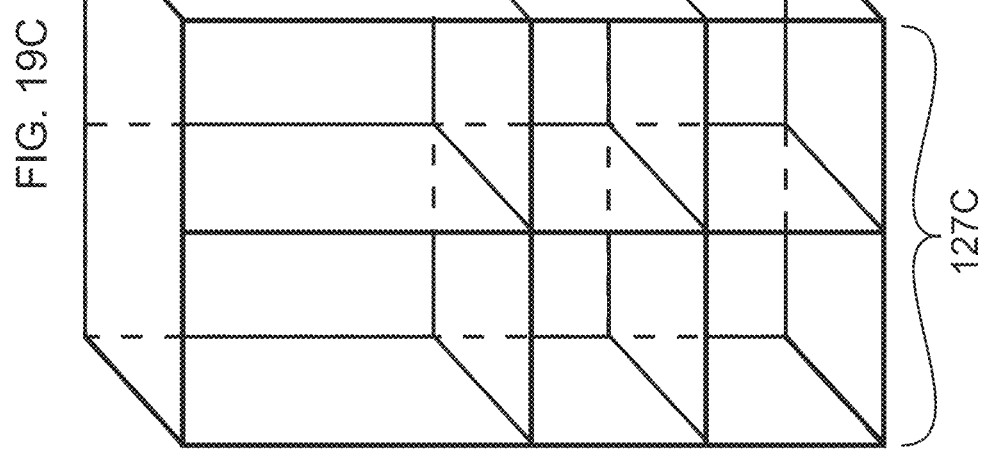

MODULAR VENDING SYSTEM FOR PROPANE CYLINDERS

FIELD OF THE INVENTION

The present invention is generally related to vending systems. More particularly, the invention is related to a vending system for dispensing items such as propane (liquefied Petroleum Gas) containers or other products that require a vending machine that adheres to strict codes, regulations and laws for storage and vending of potentially hazardous items (i.e. those items requiring a hazardous location rating outside a storefront or similar venue).

BACKGROUND OF THE INVENTION

The use of self-service vending machines to dispense food, beverage(s), movies and other items is well-known in the art. A majority of these vending machines are generally located outside a storefront to save retail space within the interior of the store. Locations where containers for LPG (liquid petroleum gas, or propane) will be stored and potentially vended require special vending systems that can adhere to appropriate rules for Class I Division 2 hazardous locations. As recognized by those familiar with the regulations involved, Class I locations are those in which flammable vapors and gases may be present. In more detail, Division 2 locations are generally described as those locations where flammable vapors and gases are present only in abnormal circumstances, such as those areas where ignitable concentrations of hazards are handled, processed or used, but which are normally in closed containers or closed systems from which they can only escape through accidental rupture or breakdown of such containers or systems. In most cases where propane tanks are stored, sold or exchanged, the tanks are housed in locked metal cages. To purchase, the customer has to go inside the store to make a payment for these items, a store employee must locate the key, go outside, unlock the cage and remove one of the tanks. Obviously, this is somewhat inconvenient, time consuming, inefficient and in many cases cannot be accomplished at all due to a lack of store personnel available to complete the task. To have automated systems in the above mentioned Class I Division 2 locations, several requirements must be met. Generally, any electrical system must operate at low voltage, low amperage, and cannot have any make/break electrical connections which are not sealed (or intrinsically protected or safe using other mechanisms). Thus, systems capable of vending products in these locations must be carefully designed.

If the large items are stored in locked containers outside the store to deter theft, the customer may have to wait a period of time for the store personnel to come out and unlock the containers to access the items. This inconvenience of waiting for assistance from store personal to access these bulky items and pay for them can be frustrating. This frustration is further magnified if the store is closed for the day and the customer has to make another trip to the store when it is open to purchase the items. Additionally, having the products locked up and inaccessible to customers when the store is closed precludes the efficient sale and profitability of these items during extended/non-traditional business hours.

Vending machines for dispensing propane tanks and other items requiring Hazardous Location considerations have existed and are somewhat known. For example, U.S. Pat. No. 6,761,194 (Blong) describes a system for dispensing a plurality of pressurized propane tanks. However, none of the existing vending systems for dispensing items uses a modular approach that has the capability to quickly add-on and efficiently integrate additional modules to the main systems, such as by connecting a wiring harness from the existing module's computing hardware to the new module's computing hardware or to attach wiring directly to the existing module without adding additional computing hardware and attaching the new module. Stated differently, none of the existing systems use module attachment hardware to accommodate expansion. Prior art hazardous location vending systems generally utilize an inert gas system, or are mechanical in nature, to open doors or make the product available to customers. These systems are susceptible to failure, due to the number of components involved and the exposure to harsh environments (i.e. rain, dirt/debris, etc.).

As further examples, U.S. Pat. No. 8,712,585 (Bruck et al.) describes a vending apparatus and system that includes the use of optional modules and U.S. Pat. Appl. Pub. No. 2015/0102051 (Shimmerlik et al.) describes a modular vending machine system with re-loadable vertical product dispensing modules. These prior art vending systems are meant for use within a store to dispense consumable products and not for dispensing large and bulky items requiring a hazardous location designation such as propane tanks.

Therefore, there is a need for a modular outdoor vending system capable of storing and dispensing propane tanks (of various sizes) and other items that must be stored in and dispensed from a hazardous location compliant system. There is a further need for a vending system that does not require continuous AC power for its operation. The vending system can ideally be operated using DC batteries which can be continuously charged by AC power or a solar power so that the system continues to operate during power interruptions.

SUMMARY

Embodiments of the modular outdoor vending system of the present invention substantially meet the need for an all-weather outdoor vending system capable of dispensing, large, bulky items such as propane tanks, liquid petroleum gas cylinders, and other items that must be stored in and dispensed from a hazardous location compliant system (i.e. must meet Class I Division 2 standards for dispensing items such as propane). In the various embodiments, the system dispenses such products from modular units that are connected to and controlled by a master unit. The modularity of the invention allows it to be scaled in accordance with the needs of the retailer, i.e., additional modular units can be attached to the master unit to accommodate available space and demand. The master unit immediately integrates and controls as many add-on modules as are desired.

The systems described below are designed with very few moving parts and performs diagnostic checks of the vending compartment and bypasses those compartments with errors. This not only ensures a greater percentage of successful sales, it greatly reduces machine down time in which it cannot vend at all. Also, the system design allows for deferred maintenance because the bypassed doors do not require immediate attention and repair can wait until a predetermined number of compartments are out of service. The system also sends real time sales data and periodic (24 hrs or less) health reports through the telemetry system which allows for streamlined refill operations as opposed to the cages most propane tanks are stored in at store fronts which require regular visits to ensure supply is adequate.

The system restock function also only opens up the compartments that have been vended since the last refill. This dramatically reduces re-stock time as the re-stocker does not have to lift every tank to see if it is full or an empty return. This also reduces mistakes which result in an empty being left in an automated machine and it vends to a customer.

The vending system has a modular design that allows it to be sized to fit available space by connecting one or more free standing add-on modules in line with the existing modules. An add-on module can be added to the master module by clamping the modules together and connecting a wiring harness of the add-on module to the wiring of the existing add-on module. In accordance with this embodiment, the master module can electronically acquire the new add-on module and assimilate it into the system so that it is substantially immediately ready for vending. Thus, the system can be quickly scaled to use as many additional add-on modules as required or desired. In addition, each module can be set with different pricing to assure that multiple types of products can be dispensed from one system.

A system of the present invention thus allows retailers to carry and sell large or otherwise bulky items that might take up considerable floor space within retail premises, or that might be stored outside retail premises in an unsecured and unprotected environment. Propane tanks of various sizes and other items that must be stored in and dispensed from a hazardous location compliant system. The system enables customers to purchase such items by credit or debit cards without any assistance from store personnel and without the need to enter the store to pay for the items. Retailers can thus stock and sell large or otherwise bulky items in a fully secure and unsupervised manner both within and outside of normal operating hours. Accordingly, the invention frees retailers from having to move, restack, or re-arrange large items to avoid obstructions or unsightly displays, or from having to constantly monitor the premises to prevent thefts of large items stored outside.

In one embodiment, the vending system is DC (Direct Current) powered and continuously recharged using either AC (Alternate Current) power or solar power using an optional onboard mounted, commercially available solar panel(s). By having AC power to recharge the DC batteries allows system operation during power interruptions of up to 24 hours. In addition, the ability to use solar energy allows the vending system to be placed away from the store front, for example in a parking lot or in remote areas. This further accommodates placement in "non-traditional" locations, such as state parks, camping sites and other recreational areas where AC power is not available. In these circumstances, the need for AC power and the cost of using AC power is eliminated. In one embodiment, the ability to use solar power to operate the DC batteries allows the system to operate for up to four days without access to any other power source. With solar capabilities, convenient access to camping supplies such as propane tanks, liquid petroleum gas cylinders, etc., is provided 24 hours per day, seven days per week. In lieu of using solar-charged batteries for power, another embodiment of the vending system may use an AC-to-DC power supply operably connected to a standard wall plug.

In sum, various embodiments of the present invention can save time, money, and provide a convenient, secure and reliable way to make Propane tanks (of various sizes) and other items that must be stored in and dispensed from a hazardous location compliant system available to the consumer all day, every day, without the need for retailer assistance or supervision. The various power supply systems, modes of operation, and safety considerations make this possible. In addition, the system is efficient and user friendly, with several features specifically designed to provide necessary items to users.

The vending system further includes a master module control box which includes master computing hardware, a product selection display, and a key pad or touch pad to provide an easy user interface. The module will include a display with item prices indicated next to the products and a credit/debit card reader interface to execute payments for the product purchase. The credit/debit card reader interface will communicate with necessary telemetry which may be a commercially available system that includes a cellular uplink to authorize and complete cashless transactions. This credit card system communicates with the master computing hardware via RS-232, USB, ethernet or similar connection. The credit/debit card system can optionally be connected directly to a host point-of-sale (POS) system via Ethernet or other type of connection. Such a connection precludes the need for on-board telemetry, though on-board telemetry can still be used to transmit sales and fault reports to data and sales centers.

Once payment is accepted by the system, the door of the compartment holding the desired propane tank, liquid petroleum gas cylinders or similar items, is electronically unlocked and can be opened, thereby allowing the user to remove the item and subsequently close the door. In various embodiments the door can be opened automatically by the system or manually opened by the user. Once the door is closed, it is automatically locked. The compartment will generally not vend again until an item is restocked in the compartment and the system is reset by the operator.

In one embodiment, software programming of the vending system assures that when the last item in a module or compartment is vended, the display will indicate that the item is sold out. The system will not charge the customer until they select an item that is available. Once the software receives a selection from the customer, it prompts the customer to swipe a credit/debit card via the user display (touchscreen, pad or keyboard). Once the card is swiped, the card reader checks for available funds through an onboard cellular data uplink (or other Point of sale transmission). If funds are not available, the display prompts the customer to try another card or source of payment. If funds are available, the software then communicates with the master module, which determines which module will vend that particular item and the next available door with that selection will open.

To facilitate restocking, master module control software generally allows the operator to open all doors in any module (main module software sends a signal to each lock in that module and they all unlock and open). The system can also be set up with an additional "re-stock" selection that only opens the doors that have been vended since the last refill. The system can also be set up to continue vending from the first compartment that was vended prior to restock, or any un-vended compartments, to ensure product rotation which does not allow products in later compartments to remain unsold for long periods of time and as a result become degraded. The display also allows the operator to determine that all modules have been found and assimilated, and set prices for each individual module or all modules and see error indications in each compartment coinciding with door sensor, door and proximity sensor problems that can be corrected. Each screen on the owners section of the display can be password protected and the passwords can be changed or deleted remotely. Where an electromagnetic lock is used to secure the control door, a function on the owners section of the display can actuate the lock to open the door without using a keyed lock.

BRIEF DESCRIPTION OF THE DRAWINGS

FIGS. 3A & 3B are aside and perspective view of the modular frame of a single module assembly structure of an embodiment of a modular vending system illustrating module exterior coverings and lock and proximity sensor housings, while FIG. 3C illustrates a removable shelf;

FIGS. 4A and 4B are side views of a module;

FIGS. 5A & 5B are common setup ups of the user interface and control door embodiments of a modular vending system;

FIG. 12 is exploded view of an add-on computing hardware and enclosure to an embodiment of the modular vending system;

FIG. 13 is an illustration of a solar powered embodiment of the modular vending system;

FIG. 14 is an illustration of a DC battery backup powered embodiment of the modular vending system;

FIGS. 15A and 15B present a block diagram showing operation of a modular vending system according to an embodiment;

FIG. 16 is a block diagram showing use of a modular vending system by a user according to an embodiment;

FIGS. 17A-17D are illustrations of screens in the owners section of the user interface according to an embodiment;

FIGS. 18A-18E are illustrations of screens in the user section of the customer interface depicting different phases of a sale according to an embodiment.

FIGS. 19A-19C show several variations for the configuration of modules; and

DETAILED DESCRIPTION

Various details and features of a modular vending system are generally depicted in the FIGS. Although the modular vending system can be used for any number of purposes, the illustrated embodiments are especially suitable for vending items such as propane tanks, liquid petroleum gas cylinders; and other items that must be stored in and dispensed from a hazardous location compliant system. The modular design and features of the vending system of the present invention allow it to occupy less space in a store front as compared to other vending systems, thereby increasing store front aesthetics. In an embodiment of the modular vending system, a single master module can be electronically connected to additional modules to optimize the storage space used for the items to be dispensed.

A power management system for the modular vending system may include DC batteries with AC power to continuously charge the batteries so that the system can operate for up to 24 hours in the case of power disruptions. Alternatively, the system can use solar power, which allows the DC batteries of the system to operate for an extended period of time. The system can thus be operated in times of electrical interruption.

Figure 1A:
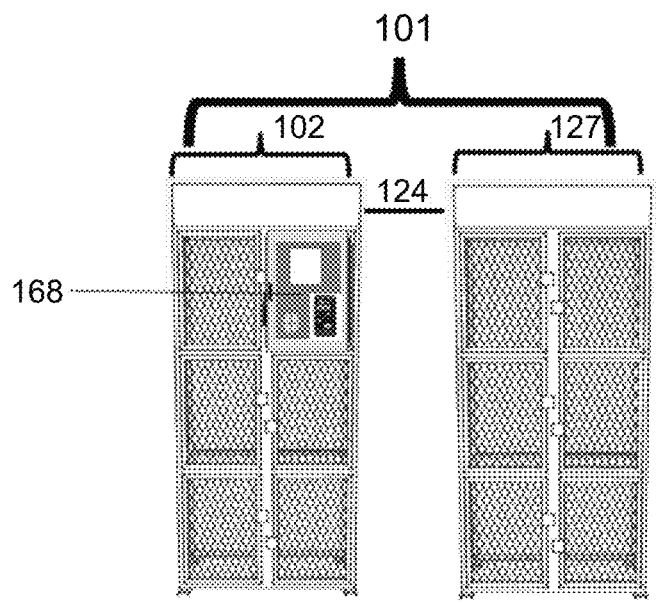
FIGS. 1A & 1B are a fronts view of an embodiment of a modular vending system illustrating the module frame and doors, showing the modules separated and combined.
Figure 1B:
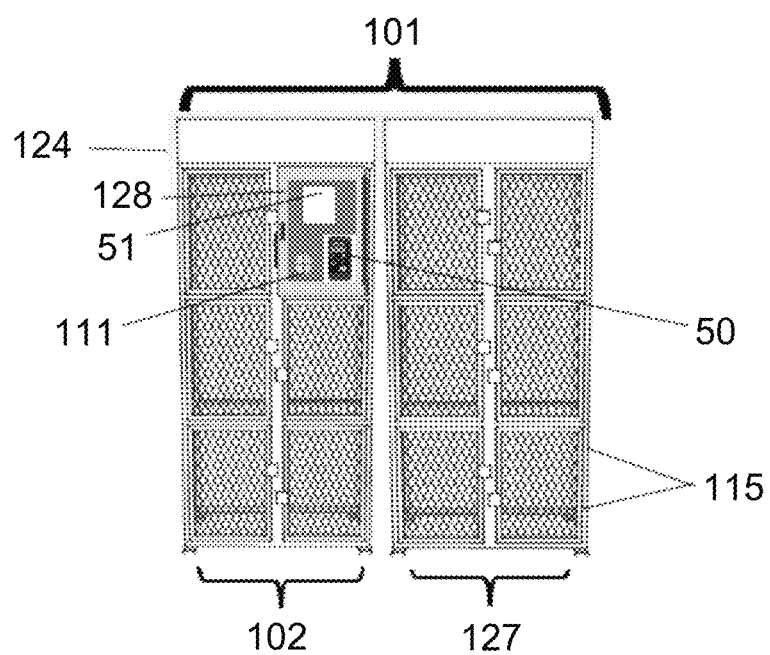
Figure 11:
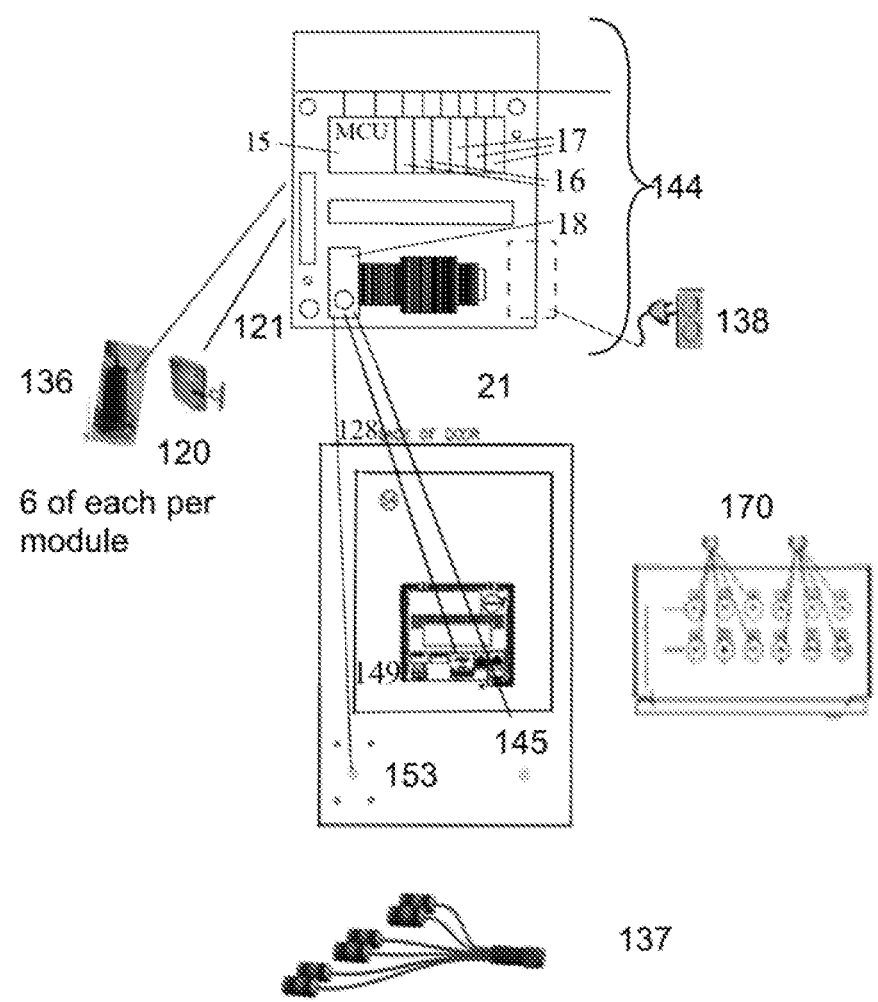
FIG. 11 is an exploded view of an embodiment of the master module computing hardware with sensor and locking device wiring

Referring now to the drawings, wherein like numerals represent like components in the several views presented and discussed, and more particularly referring now to FIGS. 1A & 1B, an embodiment of modular outdoor vending system 101 is depicted. Modular vending system 101 is generally comprised of a master module assembly 102 juxtaposed next to an add-on module assembly 127. As depicted in FIGS. 1, 10 and 11, among others, master module assembly 102 can be attached to add-on module 127 with interlocking hardware 132. The master module assembly 102 has a master module control and user interface 168 which consists of the master module control compartment face 128, the card reader system 50, the Human Machine Interface (HMI) 51, and the ADA button 111 is connected internally to a master module control box that also controls the functions of the compartments in the master module assembly 102 and add-on module assemblies 127. The add-on module assemblies 127 are typically of similar construction and materials as the master module assembly 102.

In the illustrated embodiment, add-on module assemblies 127 do not have battery or battery tender requirements so that items can be dispensed from all module compartments of the add-on module assemblies 127 through the master module control compartment interface 166. The master module assembly 102 and the add-on module assemblies 127 may be fitted with their own shed style roof 124 made of metal. Each roof 124 may be fitted with a roof light 165 that comes on during hours of darkness for the module with the item being vended and goes off after the vending process has ended to provide the necessary illumination when removing items from the compartments. Certain structural components of both master module assembly 102 and add-on modules assemblies 127 may be hot-dip galvanized prior to installing additional parts and equipment. In some embodiments, solar panels 160 are installed on the roof 124 of the master module assembly 102 and add-on module assemblies 127 or to a mounting pole located near the master module 102 to charge the DC batteries.

Figure 2A:
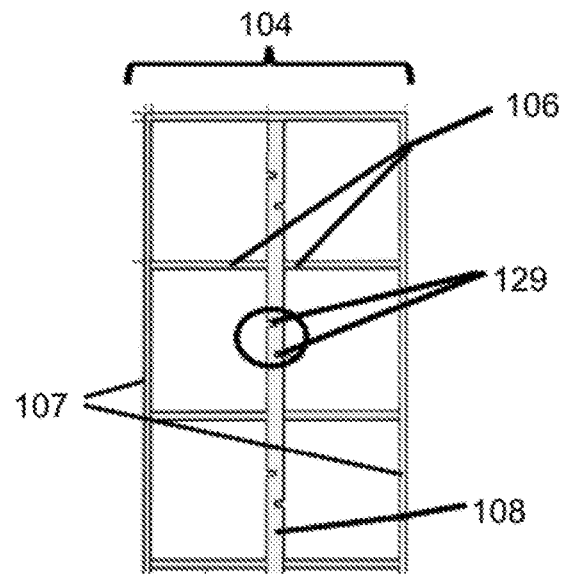
FIGS. 2A & 2B are a front and perspective view of the modular frame of a single module assembly structure and lock and proximity housings of an embodiment of a modular vending system.
Figure 2B:
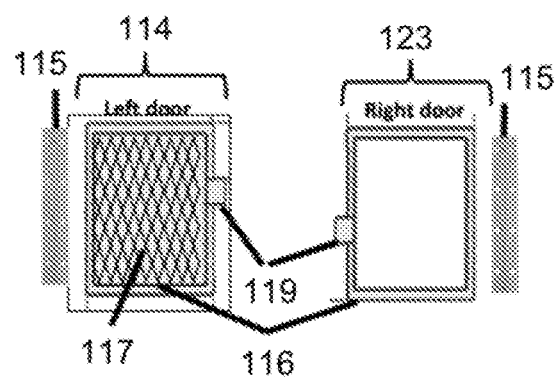

Referring to FIG. 2A, modular frame 104 of a single module assembly structure may include metal iron channel 108, angle iron 106 and square metal tubing 107. The center channel 108 may have lock and striker notches 129 to allow the electromagnetic lock to mate with the door striker. As generally illustrated in FIG. 2B, Each opening in the front of the module frame 104, is fitted with a left door 114 or right door 123 as appropriate and consisting of a door frame 116 and exterior door covering 117 and attached to the module frame 104 by a hinges 115. The striker plate 119 is mounted to the door frame 116 and has a striker 166 mounted to it.

Referring to FIG. 3B, modular frame 104 of a single module assembly is illustrated. Modular Frame 104 will include a proximity sensor and wiring housing 112 and a locking device and wiring access housing 109 which may be removable. These parts are generally constructed from metal but can be of any sturdy material that are sufficient to carry the weight of the items being vending and preclude theft. Modular frame 104 is specifically created to include a number of support holes 173, which are designed to provide support for removable and adjustable shelves 113. FIG. 3C provides a bottom view of one exemplary shelf 113, which has a number of extensions, pins or small posts 175 extending outwardly. It is contemplated that these posts 175 will be inserted into support holes 173 to provide appropriate placement and holding of shelf 113. Naturally, other approaches could be used, including bolts, removable pins, spring loaded pins, or other structures capable of providing physical support for shelves 113. It is also possible that hinges could be used, so the shelves 113 could be simply swung in and out of position, as needed.

Shown in FIG. 3A, the left door assemblies 114 and right door assemblies 123 are attached to the module frame 104 with hinges 115. Additionally up to six leveler/feet 118 are attached to the bottom of each module frame 104 to level each module and secure it to the ground.

Referring to FIG. 4, a module side view the module frame 104 and the module exterior cover-side 110, along with the proximity sensor and wiring housing 112 and the Locking device and wiring access housing 109. This also shows another view of the leveler/feet 118 on the front and back of the module frame 104.

FIGS. 5A and 5B, show examples of a common master module control and user interface 168 which consists of the master module control compartment face 128, a card reader system 50, Human Machine Interface (HMI) 51, and ADA button 111. Each of these components are connected internally to a master module control box (not shown) that also controls the functions of the compartments in the master module assembly 102 and add-on module assemblies 127. FIG. 5A depicts common master module control and user interface 168 mounted in the upper right and compartment of the master module assembly 102. FIG. 5B shows the interface 168 mounted in the roof 124 although mounting of the interface can be in other areas or compartments depending on the configuration of the modular outdoor vending.

Figure 6A:
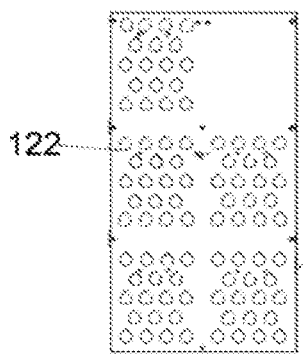
FIG. 6A is view of an the exterior rear coving of a module.
Figure 6B:
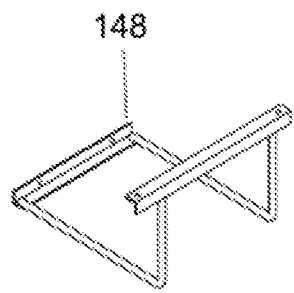
FIG. 6B illustrates and upper item guide.
Figure 6C:
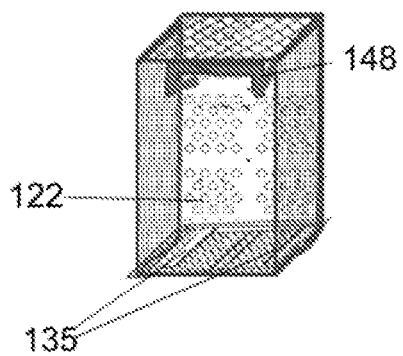
FIG. 6C shows the upper and lower item guides of an embodiment of the modular vending system.

FIGS. 6A-6C illustrate the standard module back panel covering 122 which may have additional vent holes in the shape of propane cylinders for aesthetics, however any shape or vent design is appropriate. An item guide upper 148 (see FIG. 6B) is placed and sized so that the propane tank or cylinder cannot be placed in the compartment upside down or laterally and also prevents the tank from being removed should someone cut the various exterior coverings to gain access. The item guide-lower 135 is secured to the compartment floor and is sized so that the tank bottom slides between the side legs. As shown in FIG. 6C, the compartment is sized so that when the door 114 or 123 is shut the door exterior covering 117 will contact the tank and push it in contact with the rear leg of the item guide-lower 135, thus ensuring that it is within the sensing range of the proximity sensor 136 (in this embodiment, this could be an Infrared, Ultra Violet, Inductive, pressure or capacitive sensor). As shown, proximity sensor 136 is mounted in each compartment in such a way that the proximity of the returned (empty) item activates the sensor and sends a signal to the controlling hardware for that module indicating that the item is present in the compartment. The sensor 136 has an adjustable depth for fine tuning by screwing or unscrewing the attached lock nut that mates with proximity senor and wire housing 112.

Figure 7A:
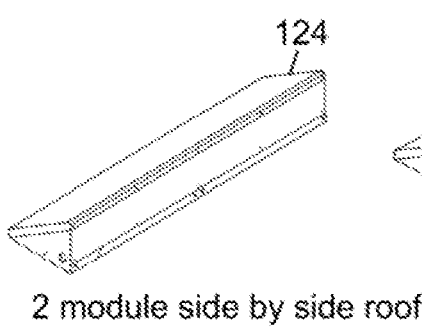
FIGS. 7A, 7B and 7C illustrate common roof assemblies.
Figure 7B:
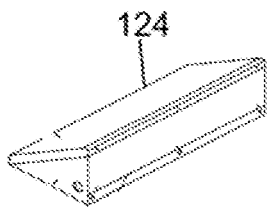
Figure 7C:
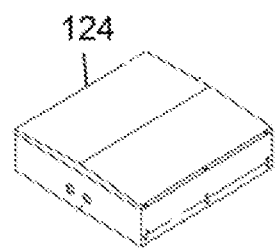

FIG. 7 depicts various alternative views of common roof assemblies which may be used, depending on the configuration of the modular outdoor vending system 101.

Figure 8A:
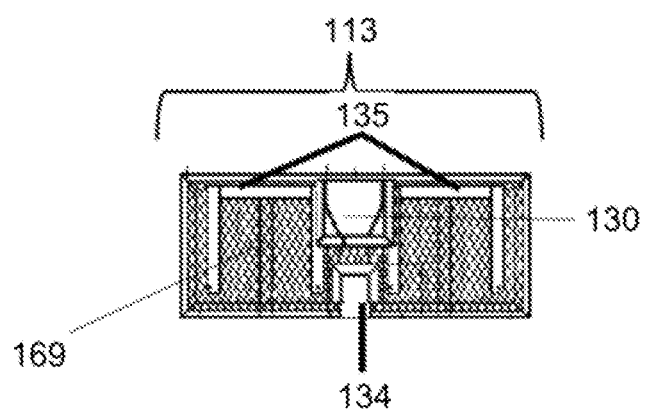
FIG. 8A is view of the module floor assembly and FIGS. 8B & 8C are views of the lock and proximity sensor housings with sensors and locks of an embodiment of the modular vending system.
Figure 8B:
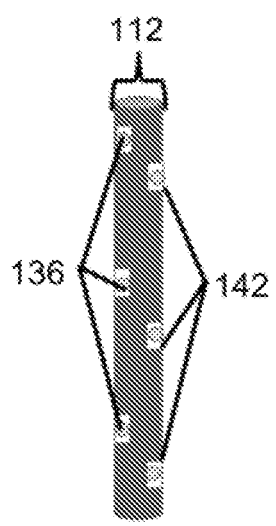
Figure 8C:
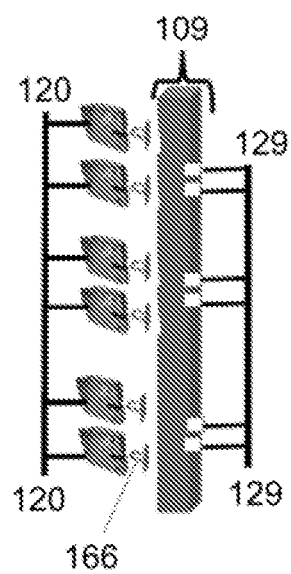

FIG. 8A depicts a top down view of the module compartment floor 113 which is comprised of item guide-lower 135, the lock and wiring housing cutout 134, the proximity sensor housing cut out 130 and the module exterior floor covering 169 which may be made of expanded metal or sheet metal or other sturdy material. Also depicted in FIG. 8B is the exploded view of proximity sensor 136 and wiring housing 112 connected with proximity sensors 136 (again, Infrared, Ultra Violet, Inductive, pressure or capacitive are common choices). Proximity sensors 136 are mounted in each compartment in such a way that the proximity of the returned (empty) item activates the sensor and sends a signal to the controlling hardware for that module, indicating that the item is present in the compartment. Proximity sensor mounts 142 are installed to accommodate placement of proximity sensors 136. The locking device and wiring housing is also depicted in FIG. 8C, which includes an exploded view of the electronic locking devices 120 and the striker 166. A lock and striker notch 129 in the housing allows contact and locking-unlocking operation of the striker 166 with the electronic lock 120.

Figure 9:
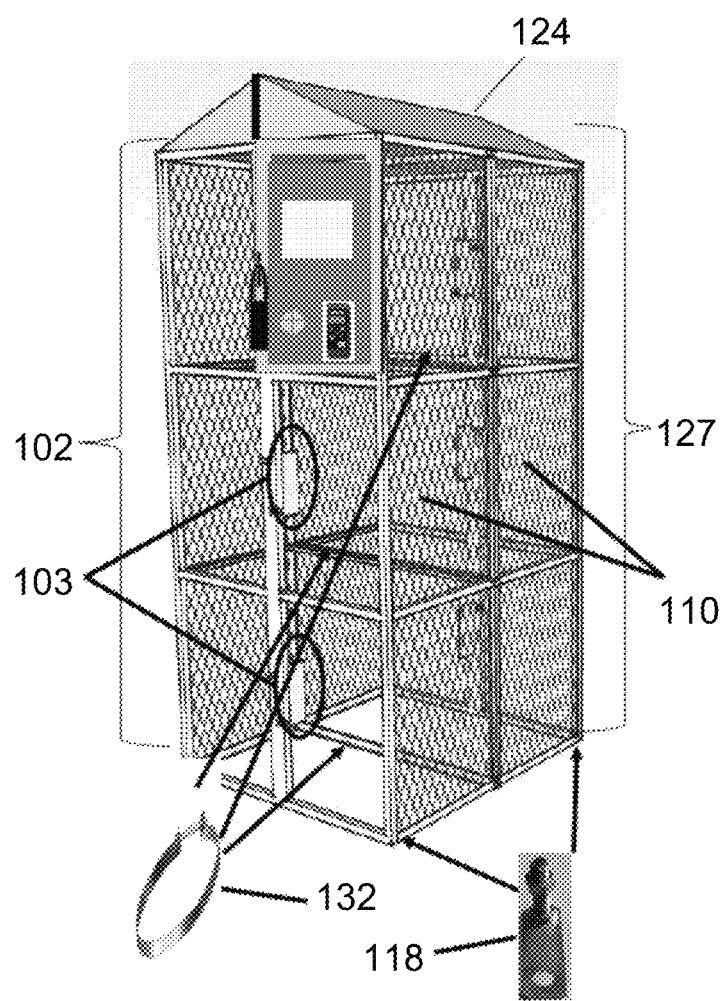
FIG. 9 is a perspective view of an embodiment of the modular vending system illustrating a master module assembly an add-on module assembly back to back with securing and mounting hardware.
Figure 10A:
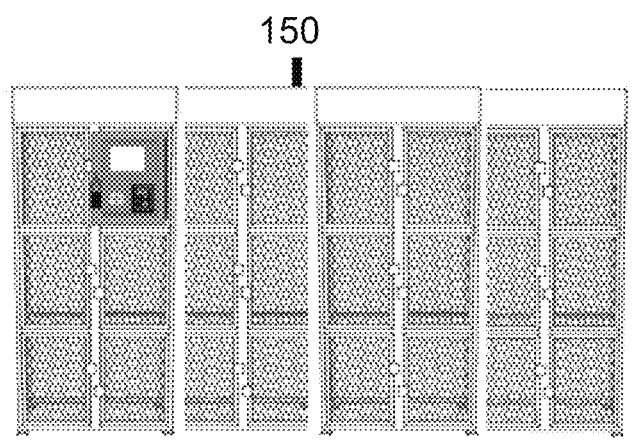
FIGS. 10A-10D are illustrations of common configurations of an embodiment of the modular vending system.
Figure 10B:
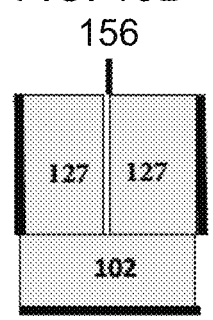
Figure 10C:
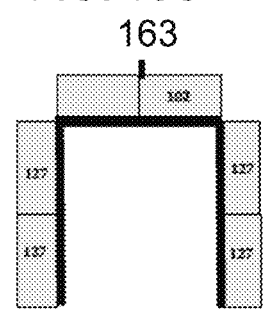
Figure 10D:
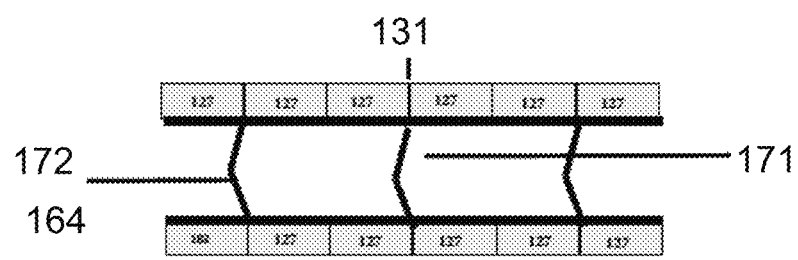

Referring to FIG. 9, an installation is shown in which two modules are aligned next to each other. Here, the positioning of the module interlocking hardware 132 and an example of the system securing and feet/levelling device 133 is also shown. According to this embodiment, master module assembly 102 is juxtaposed next to and behind an add-on module assembly 127. The add-on module 127 may have the add-on module hardware 164 encased in the add-on controlling hardware enclosure 154 and is positioned on the top module compartment. The add-on module assembly 127 is attached to the master module assembly 102 using the module interlocking hardware 132. Additional add-on module assemblies 127 may be linked together using the module interlocking hardware 118 to form a plurality of configurations. System securing devices 132 are attached to each module assembly and the levelers/feet are attached to the ground to assure that the system is properly secured and will not topple and injure potential customers trying to access the module compartments to retrieve items. Electronic locking device mounts 103 are depicted showing where the electronic locking devises 120 are mounted.

Figure 19B:
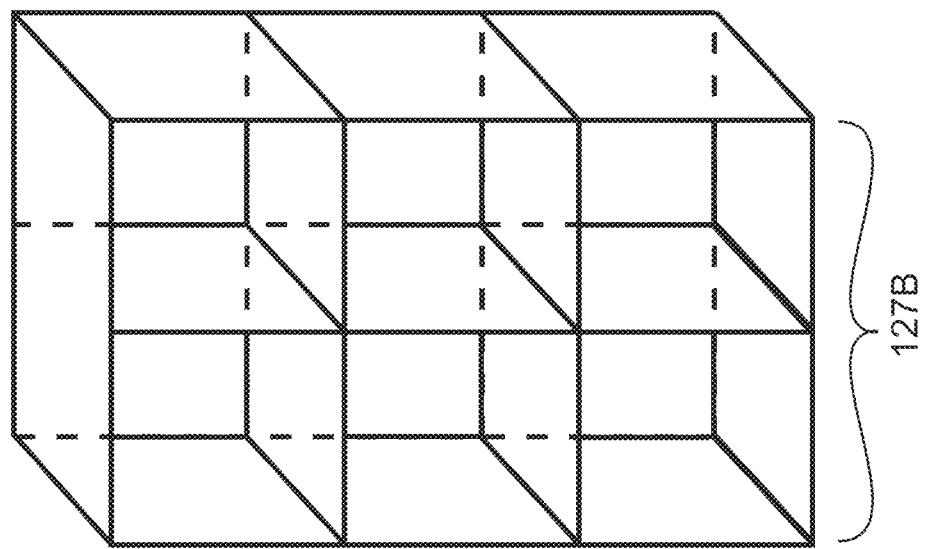
Figure 19A:
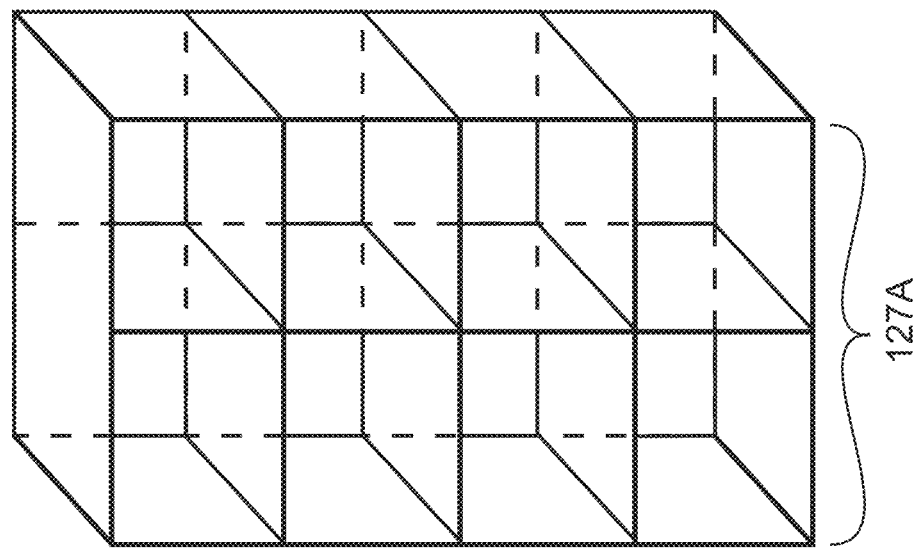

The embodiment set forth in FIG. 9 includes main module 102 and one add-on module 127, with each of the modules including six (6) compartments. Depending on the type of products involved, and anticipated needs, the modules can easily be configured to have different sizes and numbers of compartments. As an illustration, FIGS. 19A-19C show a few possible variations for the possible modules add-on module 127. More specifically, FIG. 19A illustrates an add-on module 127A having eight compartments, FIG. 19B illustrates an add-on module 127B having six compartments, and FIG. 19C illustrates an add-on module 127C also having six compartments, however some compartments having differing sizes. It is contemplated that each compartment will have a corresponding door and locking mechanisms, thus providing a system configuration that is very flexible and adaptable. Although FIG. 19 illustrates different configurations for add-on modules 127, it will be understood that main module 102 can also be configured in many different ways. Additionally, many alternative configurations for the number and size of compartments are possible.

Although not specifically illustrated in FIG. 9 or 19, it will be understood by one skilled in the art that compartment configuration within a module can be easily modified in many additional ways. For example, add-on module 127 could be configured to have only two side-by-side compartments, with each compartment extending the entire height of the module's frame. In this configuration, there would be no internal shelves used, and two tall doors might exist. With these two "tall" compartments, large gas cylinders could be stored and vended in a convenient manner. Using a related approach, the interior portions of add-on module 127 could be configured with removable shelves, so two compartments could be reconfigured to form a single compartment by simply removing a shelf. In this approach, the two related doors (i.e. those doors above and below the removed shelf) would need to operate in a coordinated manner to provide access to the combined compartment. In yet another alternative, the shelves could be hinged, so an upper shelf could simply be folded downward, again easily creating a compartment having an increased size. With hinged or removable shelves, the operator could easily reconfigure the compartment even when the various modules are placed in the field. Further, since each module has dedicated computing hardware (e.g. add-on module computing hardware 146), it is very convenient to carry out this reconfiguration. The dedicated computing hardware for each module can easily be programmed to recognize the module configuration (i.e. number and size of compartments, associated doors, etc.) and provide necessary signals back to the main module control hardware. With this information, main module control hardware is able to provide coordinated control of the overall system, and provide current information to the user (via HMI 51).

Figure 20C:
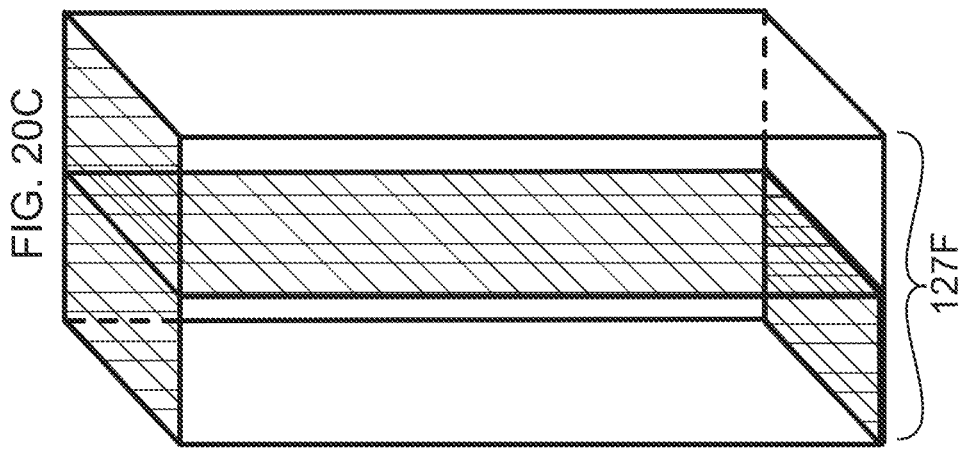
FIGS. 20A-20C are perspective views of a reconfigurable module in different configurations.
Figure 20B:
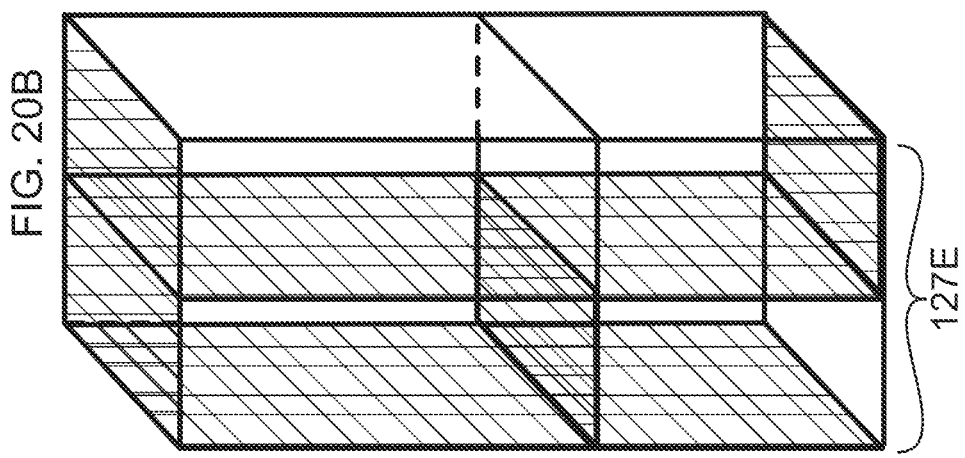
Figure 20A:
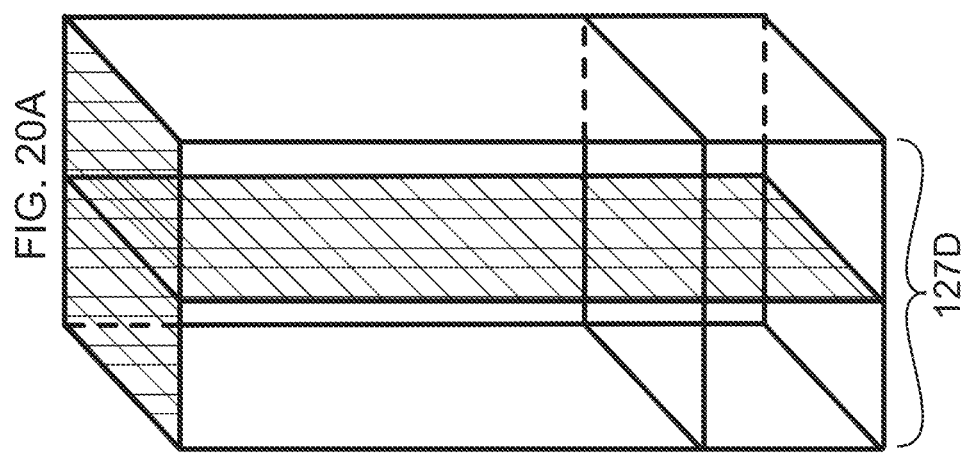

As appreciated by one skilled in the art, there are several ways to accomplish the above mentioned reconfiguration features. FIGS. 20A-20C generally outline one embodiment for achieving these features. In the configurations shown, add-on module 127 is configured with removable/adjustable shelves. In FIG. 20A, the module 127D is configured with a frame structure so that four doors (not shown) would be used to cover the front openings. Here, all shelves have been removed, so only two compartments are present. In FIG. 20B, the frame structure of module 127E is again configured to accommodate four doors (again not shown) and to have four compartments. Here, the left hand side has a shelf in place, thus defining two compartments on that side. The right had side has the shelf removed. In this configuration, the two compartments are "opened up" to create one large compartment by simply removing the shelf. FIG. 20C has only two compartments, however a movable shelf could be used to alter the use/configuration of the module. In this configuration, it is contemplated that he module 127F will use only two doors, but one compartment could be used to house multiple related products (e.g. a propane tank and related attachment, such as a heating element), with each product positioned on a particular shelf.

Referring now to FIG. 10, various common configurations of the modular outdoor vending system 101 are depicted. In FIG. 10A, the straight line configuration 150 shows the master module assembly 102 attached to a plurality of add-on module assemblies 127 which are arranged side by side. Here, roofs 124 can cover a single module, or two modules, which increases the stability of the modules by tying two modules together. The Triad configuration 156 shown in FIG. 10B, a top down view of the master module assembly 102 joined at a ninety degree angle to two add on modules 127 which are placed and secured back to back. The horseshoe configuration 163 is illustrated in FIG. 10C with compartments facing inward show groups of 2 modules arranged with the master module assembly 102 on the right side but can be placed in any of the module positions. The tunnel configuration 131 shown in FIG. 10D the top down view of 2 sets of inline configurations 150 facing each other with metal cross members 170 spanning and attaching to the roofs at regular intervals to provide stability. One cross member is hollow and houses the communication and power wiring 164 to the next set of in line modules. The add-on computing hardware 146 is housed in the add on computing hardware enclosure 154 and may be placed in one of the module compartments or on the ceiling of the modules under the roof 124.

As shown in FIGS. 11 & 12, the master module computing system and associated hardware 144 is shown, with the power cord 3 and the AC power 138 connecting to the power supply 18 which in turns powers all the associated hardware, including telemetry system 21, card reader 153, ADA button 145 and HMI 149. The Micro Controlling unit (MCU) 15 and associated inputs/outputs, connect all these aforementioned items, along with the proximity sensors 136 and electromagnetic locks 120. The master computing hardware is housed in the master computing hardware enclosure 1 and can be located within in the upper right hand compartment of the master module assembly or another compartment in the master module assembly, or attached to the outer side or front of the master module assembly. The HMI and ADA button are housed on the back of the master module control compartment face and housed in the HMI enclosure 54. Such positioning facilitates use by customers and maintainers and complies with the Americans with Disabilities Act (ADA) and other regulatory requirements. An "ADA button" 111 may also be mounted to the lower part of the compartment front at a height that meets ADA standards and is programmed to vend only from compartments that are within the ADA specified heights from the ground.

A single item Master computing unit (such as MCU 15) and associated internal or external relays 16 & 17 may also be used to power and control the entire system. Additional relays 16 and 17 can be added or removed depending on the number of modules in the system. The electromagnetic lock 120 has a door lock sensing function built in to it. This includes a lock sensor (not shown) which sends a signal to the controlling hardware, thus indicating when the door lock mechanism is in the closed or locked position. When the MCU 15 receives the signal confirming that the door is closed, and a signal is provided from the item proximity sensor indicating that the return is present, the final steps of the transaction can be completed. More specifically, the MCU 15 determines that a return has been made and is locked into the compartment, and thus provides a signal to the credit/debit card system so the customer can be charged a predetermined discounted price. If after a predetermined time, the door locked signal is not transmitted or the door locked signal is present and the proximity sensor signal is not present, this indicates that a return has not been made and/or the door is not secure. The customer interface will alert the customer of this condition and if not corrected the MCU 15 will signal the credit/debit card system to execute the sale at the full price. The customer interface will show that a full price sale was executed and the vending system will return to the ready state and await another customer request to vend.

As best illustrated in FIGS. 13 &14, DC batteries 140 and a battery tender 139 may be substituted for the power supply that converts AC power to DC power. In this embodiment, batteries 140 and battery tender 139 are used to power the MCU 15 (or multiple MCUs, or other type of computing and operating hardware) along with all associated relays 16 & 17. As generally discussed above, batteries 140 allow for the system's operation if there is an AC power interruption. Alternately, the system can be operated using batteries 140 in conjunction with solar power. To that end, commercially available solar panels 160 can be installed on the roof of the master 102 and add-on module 127 assemblies, or any other convenient locations, such as the roof of the storefront or on top of a metal pole, so as to maximize solar capabilities. In this embodiment, solar panels 160 are able to charge the DC batteries 140 via a solar power battery charge controller 162 connected to the solar panels 160 through solar collector wiring 161. As will be recognized by those familiar with solar power systems, the solar power charge controller 162 brings the collected solar energy (from the solar panels) to the DC batteries 140 through the battery wiring 143, thus keeping the batteries charged during the hours of daylight. Again, the optional capability of using solar panels 160 for powering the DC batteries 140 allows the system to be placed in many different locations, such as a distance away from the store front, in a parking lot, or in other remote areas such as state parks and camping sites where AC power may not be available. Besides eliminating the need for AC power requirement to operate the vending system, the use of solar power can also lower the energy required to operate the system while increasing functionality.

In addition to power consumption concerns, the systems outlined above help to facilitate the vending of products in Class I, Division 2 hazardous locations. The DC power levels typically contemplated by solar or battery systems are often below hazardous levels, thus significantly reducing risks. In addition, provisions related to the compartment size and construction of the compartments provide additional levels of safety.

To provide additional features, and allow an operator to better service the vending systems, one or more of the compartment doors may also have a keyed lock that is connected to a mechanical release in the electromagnetic lock system, thus providing the ability to deal with electrical or mechanical issues within the system. By providing a keyed lock, the item can be manually vended by on site personnel with the key to meet customer demand until other issues are resolved. Additionally, an override button may be mounted to an appropriate surface within the main computing hardware enclosure/compartment-. Onsite personnel with a key or code to open the main computing hardware enclosure will then have access to the button The override button is electrically connected to the master controlling hardware. Each time the button is pressed it will provide a signal to the master controlling unit, causing it to vend the next unvended container in the system. The master controlling unit will record that an onsite sale has been made. This will facilitate cash sales if desired.

Referring again to FIG. 8C, modular vending system 101 may include a locking device and wiring access housing that mounts over all the locks and associated wiring. It is attached to the top of the module. When the module roof face is removed the housing can be unattached and slid back to reveal the wiring and door locks and then slid forward and re-attached.

Also shown in FIG. 8B, a proximity sensor and wiring housing 112 is also added to each module to house the proximity sensors and wiring. The top section is attached in the same manner as the lock housing and when unattached can be positioned to allow access to wiring and sensors housed within. The sensor may comprise interlocking sections. Alternatively, the sensor housing may comprise a one-piece hollow metal structure. Each sensor housing is accessible through an access door and mount 142 in its respective compartment to facilitate installation, removal and adjustment of the sensor.

In yet other embodiments of the modular vending system 101, many variations are possible. The modules can be made out of any metal or other sturdy material and the compartments can be of any size to accommodate intended items. The shapes of the compartments can also differ from those depicted in the figures to facilitate stocking and removal of items. Modules can also be arranged in multiple configurations, including many options not depicted in the figures. In lieu of a cashless system, any sort of payment device may be substituted. The time that power is applied to the electronic locking devices can also vary. In this modular vending system, solar power using a battery tender to maintain the batteries of the system can be used; however, one skilled in the art will recognize any power source may be used to power the vending system so that DC batteries are not required.

Modular vending system 101 may also be equipped with features designed to facilitate use by disabled individuals. In one embodiment, master module control compartment interface 168 incorporates a push button positioned at a height of 40" to 48" above the ground. Further, the modular vending system 101 will only vend items located in certain compartments, such as, those compartments in compliance with the height-requirements set forth by the ADA. (In many cases this will be the middle compartments of each module.) The push button may also include instructions or other indicia of operation written in Braille. Additional features may include an audio player and speaker operably connected to a proximity sensor. In this manner, the proximity sensor may be activated by a prospective user approaching modular vending system 101, triggering an audible alert identifying the location and/or functionality of modular vending system 101.

FIG. 15 generally illustrates a flow chart outlining common customer actions. Similarly, FIG. 18 shows the greetings and customer messages generated by the system. Having thus described the various embodiments various methods of operating the modular vending system 101 will now be described. In one example, an embodiment, a user wishing to purchase a large item such as a propane tank, or liquid petroleum gas cylinders approaches the modular vending system 101 and, facing the master module control compartment interface (HMI,) such as touch screen or key pad 51, can select an item for purchase. This could be done by selecting a compartment, or selecting the type of produce desired. If all the items in that module are sold out, the display will prompt the user with appropriate information and allow the user to make another selection.

Once the item selection is made, the user presses a corresponding key on the product selection HMI (touchscreen or keypad) 51. The product selection display window displays the price and item number and prompts the user to swipe their credit/debit card in the card reader system 50. This also causes a wireless connection to be made via the telemeter 21, to the credit card verification company. Using this connection, the system 101 determines the validity of the credit/debit card and determines whether the user has sufficient funds to purchase the item.

Once the credit/debit card is confirmed, the product selection display 51 will show that the sale has been authorized and also show from which compartment the item will be dispensed. Master computing hardware 144 can then determine if the selected item is in the master module assembly 102 or located within another module. If the desired product is in the master module assembly 102, the master computing hardware will send a signal to the relay 16 or 17 controlling the lock 120 and proximity sensor in the first compartment containing the selected item. The Master computing hardware will first check to ensure there are no existing errors, such as sensor inoperative, no item detected, door not indicating locked, door indicating jammed, or compartment already vended. If there are no errors, then relays 16 and 17 will in turn provide voltage to the appropriate electronic locking device 120, and to module light 165 for a predetermined period of time. If the door lock does not open, the Master Computing hardware 144 will resend a signal to the lock to open it. If it still does not open, the master computing hardware 144 will de-active the compartment, log a door error and go to the next compartment that passes the various diagnostic checks. Alternatively lock 120 disengages from the striker 166, the door will spring open. The door assembly of each door frame 116 may include a spring, or other biasing member, such as a spring-loaded rod to cause the door to open. The biasing member is typically incorporated into the hinge of door frame 116. When the door is unlocked, the biasing member urges the compartment door into the open position. Since the biasing member pushes the corresponding compartment door away from the closed/locked position, each biasing member also functions to deter to inadvertent closure of a compartment door.

Since power will still be supplied to the locking mechanism, the door 114 or 123 can still be reopened in case the user accidently closes door prior to removal of the item. The module light 165 provides the necessary visibility in locating the correct item. The computing software is set in a manner that it only unlocks a compartment once until the system is restocked. The next selection of that item type will activate the next stocked compartment, until all items in that module are dispensed. Any further selections of that item type may display a message, such as "sold out, make another selection", on the HMI 51 and or card reader interface 50. Once the user removes the item from the compartment the customer interface will prompt the user to place an empty item back into the compartment and shut the door if they have a return. When they complete this task the computing hardware will detect the return and a closed door, and will then charge the customer the discounted return price. If the customer does not return an empty item or leaves the door open for a predetermined amount of time, the computing software will detect this and charge the customer a higher price because there is no return. After this is complete the customer interface will indicate that the transaction is complete and display the amount the customer was charged.

When an add-on module assembly 127 is connected to the master module assembly 102 or to another add-on module assembly 127 already in the system, the proximity sensor wiring 158 is connected to the appropriate enclosure (main or add on) bulkhead 170 fitting and the locking device power and sensor wiring, is connected to it corresponding bulkhead fitting 121, the new modules can be acquired by the master computing hardware 144. This can be done either manually on the owners screen, where system size can be programmed or automatically, where master computing hardware 144 can automatically communicate with each add-on module 127 and acquire it via proprietary software. Master computing hardware can then assimilate the additional module into the system so that items can be dispensed from that particular add-on module 127. The number of add-on module assemblies 127 is generally unlimited with respect to the system requirements of modular vending system 101. Once connected, the add-on module assemblies will provide appropriate communication to the master computing hardware 144 (and specifically MCU 15 therein). In some embodiments, add-on computing hardware 146 will provide periodic signals to master computing hardware 144, indicating status information. In this manner, master computing hardware 144 will be able to coordinate the operation of the overall system, while still relying on add-on computing hardware 146 to perform operations specific to add-on module assembly 127 (e.g. actuating door locks, and monitoring sensors).

During vending operations, when the master computing hardware 144 determines an item is not in the master module assembly 102, it powers down the lock 120 and proximity sensor 136 for the main module, and powers up the next add on module. Master computing hardware then runs through a diagnostic process as previously described, and is then able to vend from the next working and filled compartment. The system will complete these functions for every transaction, powering only one module at a time to conserve energy. When all items have been vended out the customer interface will display "sold out" until restocked.

As suggested above, the master computing hardware 144 controls the entire operation of this vending system 101. When power is applied to system 101, the Master Controlling hardware 144 powers up and retains pricing information, number of add-on modules or compartments in the system and which compartments have been previously vended. In this manner, sales operations are not impeded, should power be interrupted and then turned back on. The master controlling hardware 144 runs continuous self-diagnostic checks to assure relays and sensing equipment are operational, and then sends a signal to all add-on computing hardware systems 146, at a pre-determined time, to conduct similar self-diagnostic checks and signal proper operation back to the master computing hardware 144. The status is also periodically transmitted to the credit card telemetry system 21 and uplinked to databases for remote health tracking of the entire system 101. The self-diagnostic checks are typically stored in the touchpad interface (HMI) and the MCU (controlling hardware) and can be accessed by an on-screen repair function. By selecting the on-screen repair function, an operator can access a list of Compartments and their respective faults so that necessary repairs can be made and/or preventative maintenance can be performed. Faults may be additional transmitted to a data and/or communication center periodically and/or upon occurrence of respective faults via the telemetry system) of modular vending system 101.

Referring to FIGS. 15 & 16 methods for vending and purchasing items, such as propane tanks, liquid petroleum gas cylinders of various sizes and other items that must be stored in and dispensed from a hazardous location compliant system. from modular vending system 101 according to various embodiments are shown and described. The telemetry system 21 can also receive remoted signals and transmit to the master controlling hardware to change prices of each module or compartment and update firmware. Prices can also be changed at the machine using a customer interface or from a portable device or computer plugged into the master computing hardware.

Referring to FIGS. 1-18, the reference numerals shown therein refer to the following:
1 MASTER COMPUTING HARDWARE ENCLOSURE
2 BACKPLATE
3 POWER CORD
4 GFCI BREAKER
5 BREAKER BASE
6 TERMINAL
7 END STOP
8 END PLATE
9 10P PLUG-IN BRIDGE
10 FUSED TERMINAL
11 FUSED TERMINAL END PLATE
12 MARKER CARD
13 10A FUSE
14 2A FUSE
15 MICRO COMPUTING UNIT
16 DIGITAL INPUT CARD
17 RELAY OUTPUT CARD
18 120 W 24 VDC POWER SUPPLY
19 2-POSITION SELECTOR SWITCH
20 CASH SALE PUSHBUTTON
21 TELEMETRY SYSTEM
25 ⅜" LIQUIDTIGHT STRAIN RELIEF
50 CARD READER SYSTEM
51 HUMAN MACHINE INTERFACE (HMO
54 HMI ENCLOSURE
57 ½" LIQUIDTIGHT STRAIN RELIEF
62 LOCK BULKHEAD
63 PROX SENSOR BULKHEAD
64 COMMON USER INTERFACE COMBINATION
101 MODULAR VENDING SYSTEM
102 MASTER MODULE ASSEMBLY
103 ELECTRONIC LOCKING DEVICE MOUNTS
104 MODULE FRAME
106 ANGLE IRON
107 METAL TUBING
108 MODULE CENTER CHANNEL
109 LOCKING DEVICE AND WIRING ACCESS HOUSING
110 MODULE EXTERIOR COVERING-SIDE,
111 ADA BUTTON
112 PROXIMITY SENSOR AND WIRING HOUSING
113 SHELF
114 LEFT DOOR ASSEMBLY
115 DOOR HINGE
116 DOOR FRAME
117 EXTERIOR DOOR COVERING
118 LEVELER/FEET
119 STRIKER PLATE
120 ELECTRONIC LOCKING DEVICE.
121 LOCKING DEVICE POWER AND SENSING WIRING
122 EXTERIOR BACK COVERING
123 RIGHT DOOR ASSEMBLY
124 ROOF
125 CREDIT CARD READER POWER WIRING
127 ADD-ON MODULE ASSEMBLY
128 MASTER MODULE CONTROL COMPARTMENT FACE
129 LOCK AND STRIKER NOTCH
130 PROXIMITY SENSOR HOUSING CUT OUT
131 TUNNEL CONFIGURATION, COMPARTMENTS FACING IN
132 MODULE INTERLOCKING HARDWARE
134 LOCK AND WIRING HOUSING CUT OUT
135 ITEM GUIDE—LOWER
136 PROXIMITY SENSOR
137 SENSOR WIRING HARNESS
138 AC POWER
139 BATTERY TENDER
140 DC BATTERIES
141 LOCK
142 PROXIMITY SENSOR MOUNT
143 BATTERY WIRING
144 MASTER COMPUTING HARDWARE
145 CARD READER ELECTRICAL CONNECTOR
146 ADD-ON COMPUTING HARDWARE
147 MASTER COMPUTING HARDWARE POWER WIRING
148 ITEM GUIDE-UPPER
149 HMI ELECTRICAL CONNECTOR
150 STRAIGHT LINE CONFIGURATION
151 MASTER COMPUTING HARDWARE AND TELEMETER COMMUNICATION WIRING
152 TELEMETER POWER WIRING
153 ADA BUTTON ELECTRICAL CONNECTOR
154 ADD-ON CONTROLLING HARDWARE ENCLOSURE
155 ADA BUTTON WIRING
156 TRIAD CONFIGURATION, 3 MODULES FACE OUT WITH MASTER IN FRONT
157 CREDIT CARD READER INTERFACE AND TELEMETER COMMUNICATION WIRING
158 PROXIMITY SENSOR WIRING
159 CREDIT CARD READER TO MASTER COMPUTING HARDWARE COMMUNICATION WIRING
160 SOLAR COLLECTOR
161 SOLAR COLLECTOR WIRING
162 SOLAR POWER CHARGE CONTROLLER
163 HORSESHOE CONFIGURATION WITH COMPARTMENTS FACING IN
164 MASTER COMPUTING HARDWARE TO ADD ON COMPUTING HARDWARE WIRING
165 LIGHT
166 STRIKER
168 MASTER MODULE CONTROL AND USER INTERFACE
169 MODULE EXTERIOR FLOOR COVERING
170 BULKHEAD
171 CROSSMEMBER
172 HOLLOW CROSSMEMBER 164 WIRING INSIDE
173 HOLES
175 PINS OR POSTS As shown in FIGS. 17A-17D sample owners page are displayed at various times during Owner Mode. In this Owner mode (see, FIG. 16A) the system 101 displays choice of "open All", "change prices", "Repair", "Change password", "Restock", "system size", "open Control door" and "exit", to facilitate sales, restocking, resetting, and repairing the system. These functions are relatively self-explanatory. That said, the "repair" function and can be used to reset error codes following repair of the component or malfunction that caused the error code. Once selected the user can scroll through each module to check for errors, repair and retest the module. An example of the "repair" user interface is illustrated in FIG. 16C.

Similarly, when "Change prices" is selected the master module computing hardware allows the user to set display prices and prices after tax for the entire system 101 or each module 102 or 127. An example of this functionality is shown in FIG. 16B. When "Restock" is pressed, only the doors that have vended since the last restock will open to facilitate quick and accurate restocking. "Open All" will open all doors in the system sequentially only powering one lock at a time to ensure an over amperage condition does not occur. "System Size" shows the number of doors the computing hardware has in the system and can be overridden if the number is incorrect. One example of the user interface to achieve this is shown in FIG. 16D. Pressing "control door" will open the master module control and user interface compartment to gain access to the main enclosure 1 and HMI enclosure 54. Lastly, "Exit" causes the owners mode to be exited. Once the prices are set and the product restocked the user can press "exit" to return to the customer mode. If this is omitted, the display will revert to customer mode at a predetermined time.

As mentioned above, a sensor 136 (Infrared, Ultra Violet, Inductive, pressure or capacitive are common choices) is mounted in each compartment in such a way that the proximity of a stocked (full) or returned (empty) item activates the sensor and sends a signal to the controlling hardware for that module indicating that the item is present in the compartment. The compartment is sized so that the stocked item can only be placed in the correct position to activate the proximity sensor when the door is closed. An electromagnetic lock is also utilized that has a door lock sensing function built in to it. This lock sensor sends a signal to the controlling hardware indicating when the door lock mechanism is in the closed or locked position indicating that the door is closed.

As indicated above, the size of each compartment facilitates proper placement of a returned item within the compartment. Each compartment may also be configured such that closing the door of the compartment facilitates proper placement of a returned item (such as a propane tank or liquid petroleum gas cylinder). Specifically, when a door is closed, it makes contact with the returned item, thereby urging the returned it toward the correct location within the compartment. As shown in FIG. 6C, the floor of each compartment may include rails 135 to further guide the returned item into its proper storage position as the door to the compartment is closed. In embodiments wherein modular vending system 101 is adapted to vend propane and/or liquid petroleum gas, the top portion of each compartment may include a bracket 148 or other structure adapted to create an obstruction that impedes improper insertion of a bottle, tank or cylinder, such as if the cylinder or bottle were to be placed in a compartment upside down. (See, e.g. FIG. 6B).

Additionally, the compartments are sized so that if an individual attempts to gain unauthorized access, such as by cutting the expanded metal sides or a door to a compartment, the item being vended will not fit through the frame. This is particularly beneficial as a deterrent to theft of high-value items, such as propane, liquid petroleum gas or returned bottles, tanks cylinders.

A further feature and advantage of the present invention is the integration of safeguards against un-executable sales. In particular, module vending system 70 of the present will bypass malfunctioning, nonfunctional or empty compartments before executing a sale and opening a door to a compartment. For example, each compartment may include a proximity sensor 136 disposed therein. Prior to executing a sale, master module control compartment interface 168 will interrogate proximity sensor to verify whether the compartment contains an item, such as a tank, cylinder or bottle for propane or liquid petroleum gas. If the proximity sensor 136 confirms that the compartment contains an unvended item, the corresponding door will be opened and the sale will be executed. If the proximity sensor 136 does not confirm that the compartment contains an unvended item, or if it confirms that the compartment does not contain an unvended item, master module control compartment interface 168 will subsequently interrogate a proximity sensor 136 in the next compartment and repeat the steps above until a compartment with an unvended item is found.

Prior to executing a sale, master module computing hardware 144 can similarly interrogate a door cam sensor to verify whether the compartment door is open (which may indicate that the compartment does not contain an item). If the door cam sensor confirms that the door is closed and locked, the corresponding door will be opened and the sale will be executed. If the proximity sensor does not confirm that the door is closed or locked, or if it confirms that the compartment door is open, unlocked or jammed, the master module control hardware 144 will subsequently interrogate a door cam sensor in the next compartment and repeat the steps above until a compartment with no faults are found.

After the lock is activated to open the door to a compartment, the computing hardware 144 can interrogate the door cam to determine if the door to the compartment is open. If the door cam sensor indicates that the door is open, the door will remain unlocked. If the door cam sensor indicates that the door is closed, then the computing hardware will re-activate the door lock. Alternatively, or additionally, the computing hardware may activate the door lock after a predetermined period of time.

If the door cam sensor indicates that the door is closed after being opened without the proximity sensor 136 sensing that the item has been removed, the computer hardware will interpret this as an accidental closure and open the door again and/or not de-activate the lock and the door will not lock until the item is removed.

When the controlling hardware 144 receives the signal that the door is closed and there is a signal from the item proximity sensor 136 that the return is present, the computing software will determine that a return has been made and locked into the compartment and will signal the master controller hardware to signal the credit/debit card software to charge a predetermined discounted price. If after a predetermined time, the door locked signal is not transmitted or the door locked signal is present and the proximity sensor signal is not present, this indicates that a return has not been made and/or the door is not secure. The customer interface will alert the customer of this condition and if not corrected the master controlling hardware will signal the credit/debit card system to execute the sale at the full price. The customer interface will show that a full price sale was executed and the vending system will return to the ready state and await another customer request to vend. A printed receipt system is also available to install should the need arise.

Modular vending system 101 will generally vend the contents of a first compartment in the first module 102 and then will not access that compartment until the module is refilled and reset. The next sale will open the next compartment door and so on. For embodiments of modular vending system 101 having only a first master module assembly 102 but no add-on module assembly 127, the customer interface will display a "sold out" or similar message when the last item in first master module assembly 102 is vended. For embodiments of modular vending system 101 having first master module assembly 102 and at least one add-on module assembly 127, the customer interface will not display a "sold out" or similar message when the last item in first master module assembly 102 is vended; rather, modular vending system 101 will automatically allow access to the first available compartment in the next add-on module assembly 127 and continue vending until the last compartment in the final add-on module assembly 127 is vended. The customer interface may then display a "sold out" or similar message.

The credit/debit card reader interface and telemetry is a commercially available system that includes a cellular uplink to authorize and complete cashless transactions. This credit card system communicates with the master computing hardware via RS-232, USB, ethernet or similar connection.

In an embodiment, there is only one product sold and there are only two possible prices A=price with return or B=price with no return. B will always be the larger amount so that price should always be used for the authorization. These values will be stored in Master Computing hardware memory and be able to be changed at the machine or remotely. Depending on the amount of modules in the system there may not be any add-on module controlling hardware, as the master can control multiple modules depending on the specific Micro Controlling Unit used in the embodiment and if add-on modules exceed the MCU 15 capacity then controlling hardware can be added that open appropriate doors and control sensing hardware and communicate back to the master controlling hardware via wiring harnesses. The master Controlling hardware will query the system to determine how many compartments are in the system and then at the last compartment counted set up a "sold out" value to be signaled to the card reader system after that compartment is vended and the master computing hardware will continue to send that signal until the system is refilled and reset.

To start the sales process, a customer selects an item and inputs selection on a keypad, touchscreen, press a button associated with the product they desire or any other form of customer interface. In an embodiment, the master computing hardware determines the stored price of the item and sends a signal to the appropriate module computing hardware to query if there are unvended items remaining in that module. If there are not, it will sent a signal to the message screen that alerts the customer to select another item and then the master controlling system returns to the ready state. If there are unvended items in the selected module, the master computing hardware transmits Binary code via RS-232, USB or similar connection to the credit card reader which in turn performs a cellular uplink to query the credit card provider and obtain an authorization. If the pending sale is not authorized a message will be displayed on the credit card interface indicating the card was not authorized and to use another card. A signal is also send back to the master computing hardware that the card failed and it resets to the ready state. If the transaction is authorized, the card reader will send a signal to the master control hardware that the card has been authorized and the master computing hardware determines what module will vend the selected item and then sends a signal to the appropriate module and that module controlling hardware, in turn, sends a signal to the lock of the next unvended compartment to unlock. Once the signal has been sent to the appropriate lock, that module controlling hardware will signal the master control hardware that the item has vended. The master controlling hardware in turn sends a signal to the card reader system which uplinks and charges the Authorized amount to the customer's credit card. The card reader system then displays the amount that was charged and an end of transaction message. The card reader system and the master computer hardware system returns to the ready state.

In an alternative embodiment, the master computing hardware determines the stored price of the item and sends a signal to the first unvended compartment to query if there is an unvended item remaining in that module via presence of door and proximity sensor signals. This precludes vending an empty compartment or vending from a compartment that has a faulty sensor that would give an incorrect reading showing door open or item not present should a return be placed in the compartment.

The various embodiments a modular vending system described herein should not be construed to limit the scope of the present invention. It is to be understood that the embodiments of the present invention as described herein do not limit any application or scope of the invention and that the invention can be carried out and practiced in various ways and implemented in embodiments other than the ones outlined in the description above. One skilled in the art will recognize that alternatives, modifications, and variations of the embodiments of the present invention may be construed as being within the spirit and scope of the present invention and the appended claims.

The invention claimed is:

1. A vending system for vending propane containers, the vending system further meeting the requirements for use in a Class I, Division 2 location, comprising:
    a main housing having a plurality of compartments, a plurality of corresponding doors configured to enclose a corresponding one of the compartments and at least one proximity sensor within each compartment to detect the presence of a propane container;
    a control system contained within the main housing having a master controller;
    a user interface in communication with the control system; and
    a controlled power supply which complies with Class I, Division 2 hazardous location considerations connected to the control system so as to provide necessary power for the vending system;
    wherein each of the compartments and corresponding doors have a cooperating sealed electromagnetic lock/latch configured to latch/unlatch the door and thus allow a for customer to gain access to the compartment for purposes of propane container exchanges or purchases; and
    wherein each sealed electromagnetic lock/latch and each proximity sensor is sufficiently sealed such that it is approved for use in the Class I, Division 2 location.

2. The system of claim 1 wherein the master controller is further configured to coordinate payment from the user for the product, prior to providing user access to the compartment.

3. The system of claim 2 wherein payment comprises the processing of a credit card transaction.

4. The system of claim 1 wherein the containment structures within the main compartments are configured to cause the propane container to be positioned in a predetermined relationship with the proximity sensor.

5. The system of claim 1 wherein vending of the product is achieved by communicating signals from the master controller or the add-on controller to a relay operating with the door latching mechanism for the door enclosing the vend compartment, wherein the signals cause the door to be opened.

* * * * *